United States Patent [19]

Russell

[11] Patent Number: 5,278,816
[45] Date of Patent: * Jan. 11, 1994

[54] RECORDING/REPRODUCING SYSTEM USING WAVELENGTH/DEPTH SELECTIVE OPTICAL STORAGE MEDIUM

[76] Inventor: James T. Russell, 15305 SE. 48th Dr., Bellevue, Wash. 98006

[ * ] Notice: The portion of the term of this patent subsequent to Oct. 8, 2008 has been disclaimed.

[21] Appl. No.: 614,627
[22] Filed: Nov. 16, 1990

Related U.S. Application Data

[63] Continuation-in-part of Ser. No. 410,943, Sep. 22, 1989, Pat. No. 5,056,080.

[51] Int. Cl.$^5$ ............................................. G11B 7/00
[52] U.S. Cl. ............................... 369/100; 369/44.26; 369/109; 369/103; 369/112
[58] Field of Search .................. 369/94, 93, 100, 109, 369/111, 59, 103, 112, 44.26

[56] References Cited

U.S. PATENT DOCUMENTS

| | | |
|---|---|---|
| 3,501,586 | 3/1970 | Russell . |
| 3,624,284 | 11/1971 | Russell . |
| 3,891,794 | 6/1975 | Russell . |
| 4,025,731 | 5/1977 | Rembault . |
| 4,090,031 | 5/1978 | Russell . |
| 4,163,600 | 8/1979 | Russell . |
| 4,219,704 | 8/1980 | Russell . |
| 4,253,723 | 3/1981 | Kojima et al. . |
| 4,450,553 | 5/1984 | Holster et al. ...................... 369/275 |
| 4,458,980 | 7/1984 | Ohki et al. . |
| 4,532,522 | 7/1985 | Tsunoda et al. . |
| 4,577,932 | 3/1986 | Gelbart . |
| 4,656,618 | 4/1987 | Kaku et al. . |
| 4,797,870 | 1/1989 | Nagai et al. . |
| 4,908,813 | 3/1990 | Ojima et al. ......................... 369/94 |
| 5,084,852 | 1/1992 | Bailey .................................... 369/59 |
| 5,099,270 | 3/1992 | Pearson et al. ....................... 355/32 |

FOREIGN PATENT DOCUMENTS

| | | |
|---|---|---|
| 59-207433 | 11/1984 | Japan . |
| 59-210543 | 11/1984 | Japan . |
| 60-22738 | 2/1985 | Japan . |
| 60-107745 | 6/1985 | Japan . |
| 60-202554 | 10/1985 | Japan . |
| 60-219647 | 11/1985 | Japan . |
| 60-247842 | 12/1985 | Japan . |
| 61-115274 | 6/1986 | Japan . |
| 61-129748 | 6/1986 | Japan . |
| 61-260434 | 11/1986 | Japan . |
| 62-43839 | 2/1987 | Japan . |
| 62-89253 | 4/1987 | Japan . |
| 62-267932 | 11/1987 | Japan . |
| 63-119045 | 5/1988 | Japan . |
| 1-43827 | 2/1989 | Japan . |
| 1-154321 | 6/1989 | Japan . |
| 1-165035 | 6/1989 | Japan . |
| 2119109A | 11/1983 | United Kingdom . |

OTHER PUBLICATIONS

Fundamentals of Optics, Jenkins and White, McGraw-Hill, 1950, Chapters 13, 15, 16, 17, and Sections 17.1, 17.2 and 17.3.

Fourier Optics: an Introduction, E. G. Steward, Ellis Horwood Ltd., Publisher, Halsted Press/John Wiley & Sons, 1987, Chapters 2 and 4, and Appendix C.

CD Rom the New Papyrus, S. Lambert, S. Ropiequet, Eds., Microsoft Press, 1986.

Principles of Optical Disc Systems, G. Bouwhuis, J. Braat, A. Huijser, J. Pasman, G. van Rosmalen, K. Schouhamer Immink (all at Philips Research Laboratories, Eindhoven), Adam Hilger Ltd., 1985.

*Primary Examiner*—Jeffery Brier
*Assistant Examiner*—Robert Chevalier
*Attorney, Agent, or Firm*—Graybeal Jackson Haley & Johnson

[57] ABSTRACT

Apparatus and method for encoding information and recording same as sets of variably spaced related marks stored in wavelength (color) and/or depth selective layers on the optical record wherein the encoded information is read by illuminating each set of such recorded marks selected by wavelength (color) or focal depth with a coherent read light to cause an optical interference pattern consisting of a varying distribution of amplitude maxima separated by amplitude nulls (or minimas) that change in accordance with the encoded information. This read interference pat-tern is detected by photosensing diode arrays and after decoding, the system outputs an information signal representing the original information.

36 Claims, 11 Drawing Sheets

FIG. 1 RECORDING
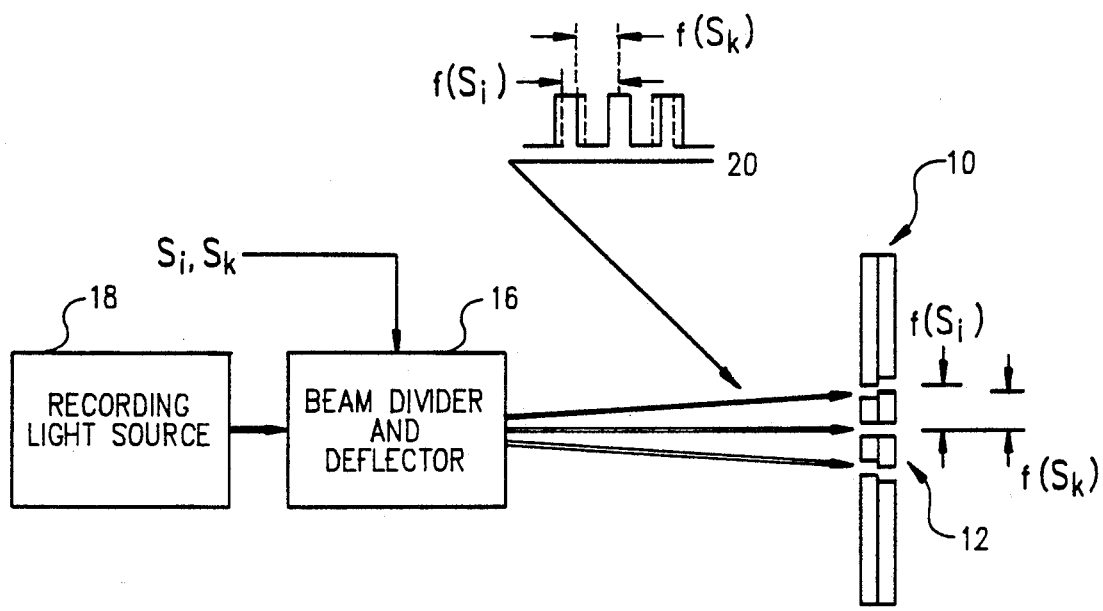
FIG. 2 READING
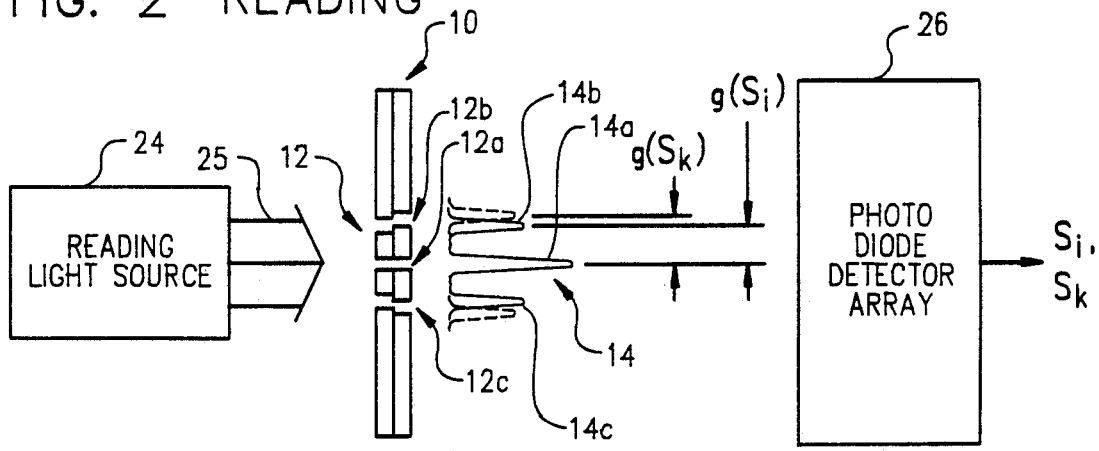
FIG. 5
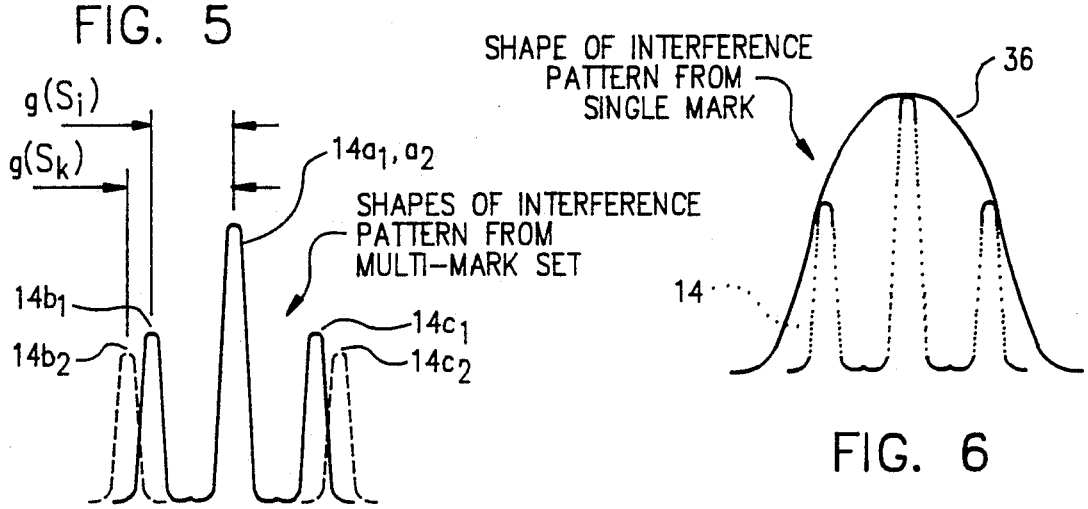
FIG. 6

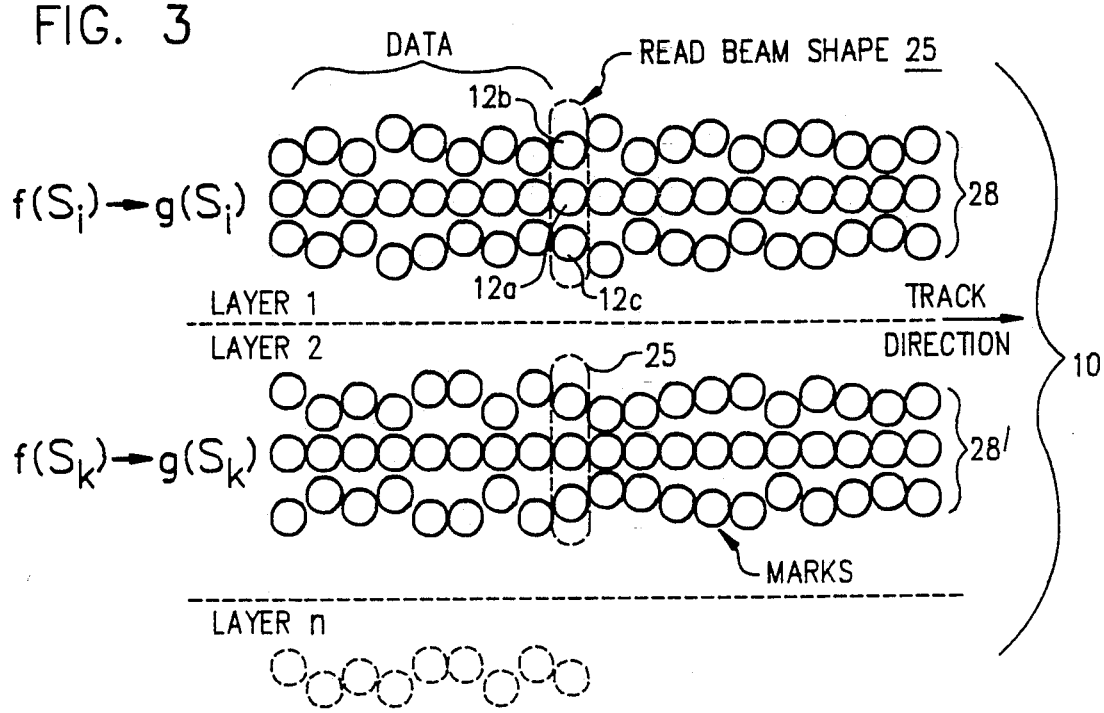
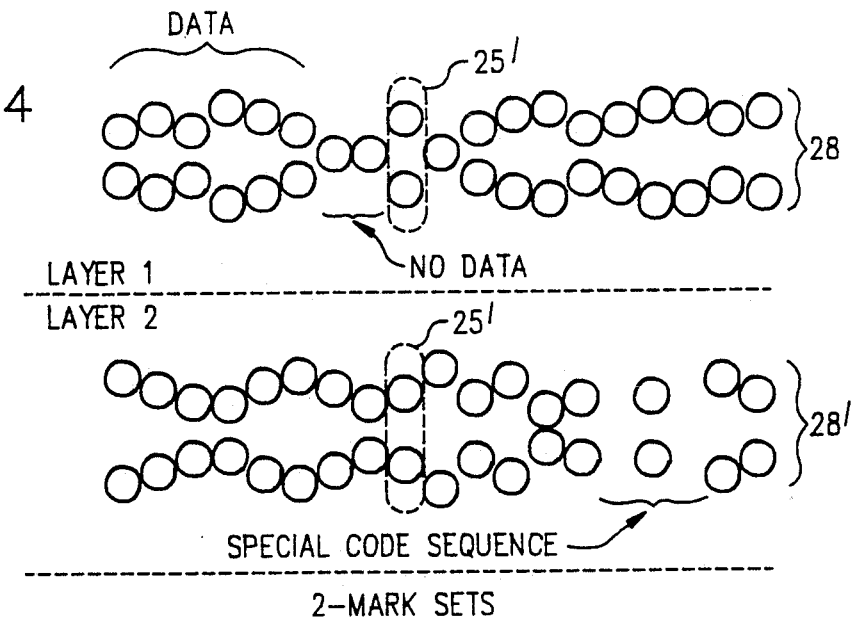

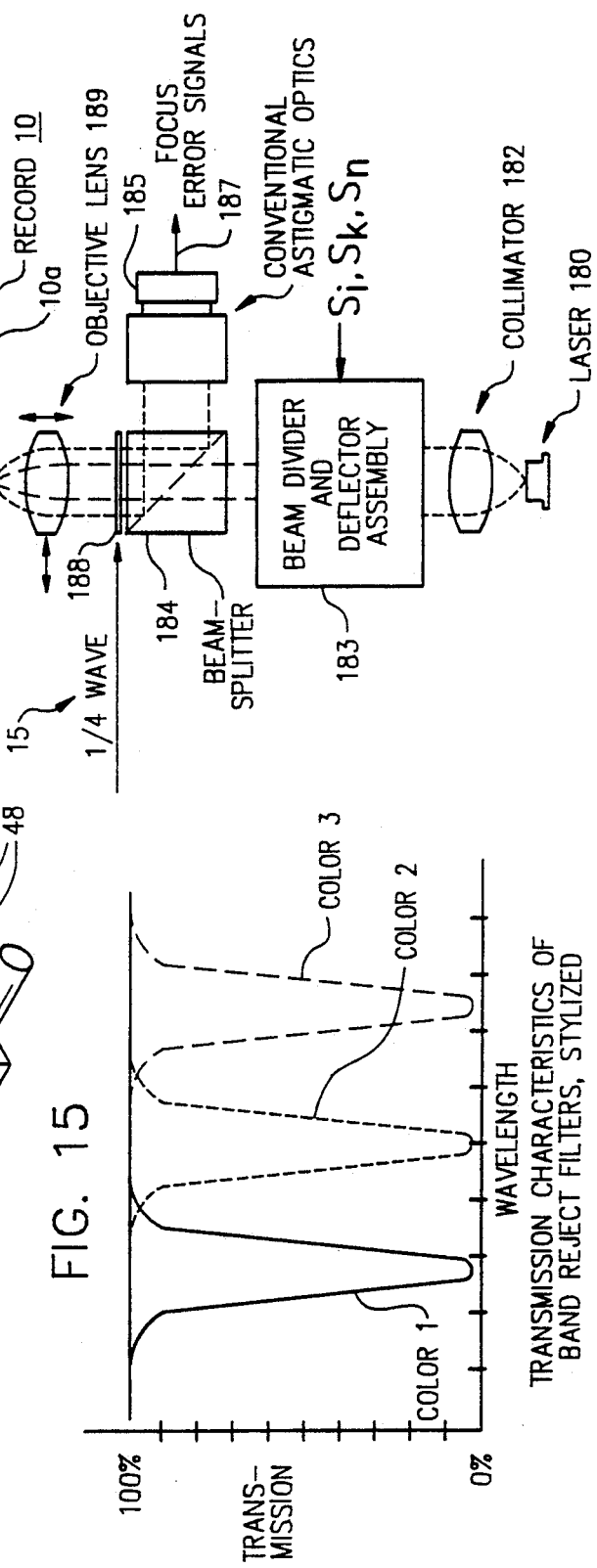
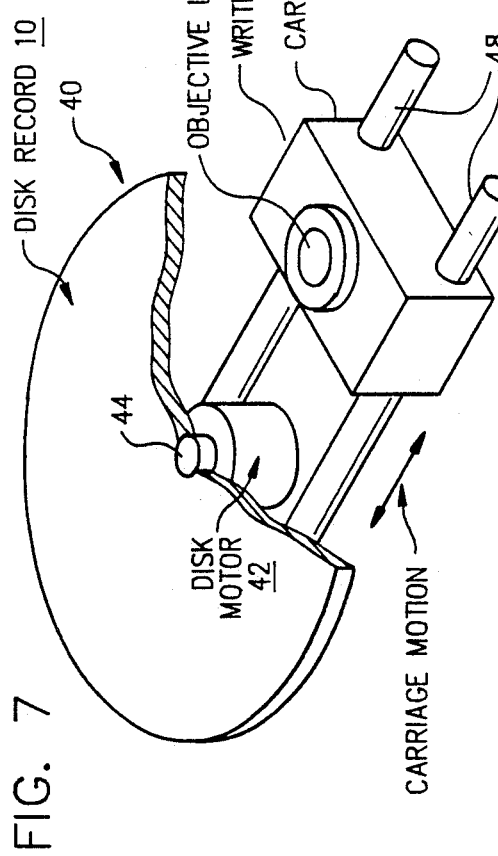
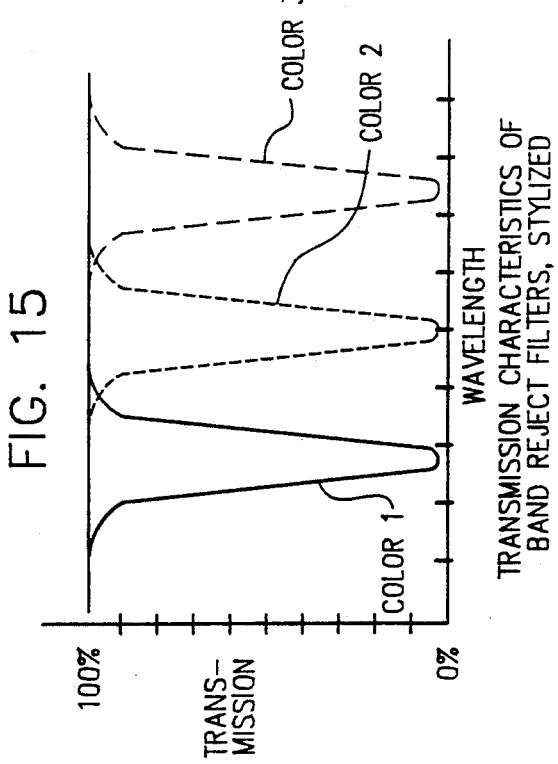

SYSTEM TO SHIFT FOCUS BY COLOR

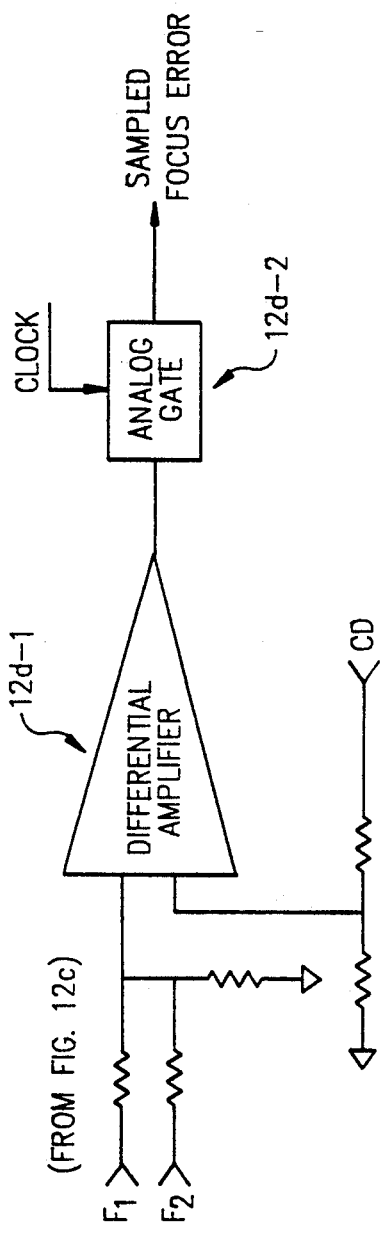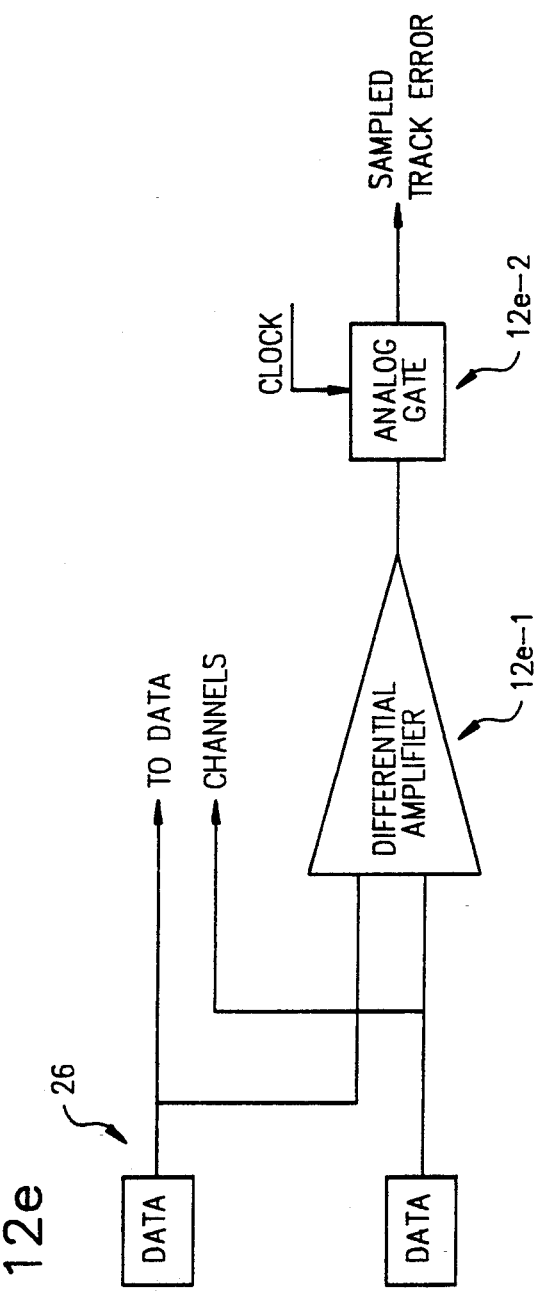

MULTI-COLOR LAYERED RECORD

MULTI-LAYER, MULTI-FOCAL PLANE RECORD

RECORDING/REPRODUCING SYSTEM USING WAVELENGTH/DEPTH SELECTIVE OPTICAL STORAGE MEDIUM

CROSS REFERENCE TO RELATED APPLICATIONS

This is a continuation-in-part of U.S. patent application Ser. No. 07/410,943 filed Sep. 22, 1989, now U.S. Pat. No. 5,056,080 issued Oct. 8, 1991.

BACKGROUND OF THE INVENTION

The subject matter of the invention relates to optical data storage in which information is recorded onto and retrieved from a record capable of storing the information in the form of optically imprintable markings and retrieving such information from these markings by optical devices.

Various forms of optical data storage are currently available for recording both digital and analog information. For example, analog data is recorded on optical disks by encoding the data in the form of variable width pits or depressions in the record and then reading this information by electro-optical means.

Another example of existing optical data storage is provided by the popular "Compact Disc" technology in which music and other audio information is recorded onto small optical record discs that are capable of storing large amounts of prerecorded music and other audio tracks. This Compact Disc technology, made popular in the field of prerecorded music, is now being used to store computer data. Software programs and data can thus be stored on a physically small record in amounts many times greater than popular magnetic disc records. For example, a Compact Disc can store the equivalent amount of computer data that would require over one thousand "floppy" magnetic discs of the popular 5¼ size used in personal computers.

Despite the impressive advances of optical data storage techniques, there are, nevertheless, limits to the amount of information that can be recorded on an optical record. Moreover, there are significant limitations in the low rate of data recording and data access available from existing optical storage techniques. Furthermore, advances are being made in magnetic recording technology and in other storage materials to increase their storage capacity, narrowing the net advantage of optical data storage systems.

As related background to the subject invention, the existing optical data storage techniques most typically store information in the form of a series of data bits in which each bit is represented on the record as a physical mark or transition from one physical mark to the next along the direction of scan. For example, data may be recorded as a series of pits spaced along a record track. Each pit or transition between pit and surrounding land represents a single bit of data. In this prior type of optical storage, the data bit is encoded in the form of a physical mark on the record which can be read by optical means, such as by irradiating the object mark by a light source, usually from a semiconductor diode capable of emitting a small laser beam. Because each data bit requires a distinct mark, which we call an object mark, on the optical record, the amount of data that can be recorded is limited by existing means for forming the object mark and for sensing its presence or absence along the record track. In other words, each physical object mark on the record yields only one bit of data, and, of course, many hundreds of thousands of such data bits are required in order to store any significant amount of information.

Also, in regard to existing optical data storage systems, binary object marks on the record along the data track pose difficult practical problems of: tracking to insure proper alignment of the read/write optics with the data, focusing of the read/write optics to insure an adequate signal-to-noise ratio in the retrieved data, synchronizing the read electronics with recovered data bit signals, and compensation for the broad frequency band width of the detected data stream. These compensation or correction requirements for accurate tracking, focusing, and synchronizing have led to the adoption of certain sophisticated bit/word encoding schemes, such as the well known 8 to 14 code. However, such encoding techniques reduce the amount of data that can be recorded over any given unit of length along the track, and limit the effective rate of data retrieval.

It is noted that some existing optical data storage systems use diffraction light patterns for tracking. However, it is important to distinguish the use of such diffraction light patterns for such a purpose, i.e., tracking, from the present invention's use of interference light patterns as described herein for actually encoding the basic information signal in a changeable interference pattern extracted from the record during read. Existing uses of diffraction patterns are limited to the formation of side lobe sensing windows located on opposite sides of a central read lobe and merely assist in maintaining the central read lobe on track center.

Also, the principle of the present invention is to be distinguished from certain holographic systems in which the optical interference pattern itself is recorded to enable reproduction of the holographic image.

By way of further background, reference is made to the following treatises dealing with optics and recording techniques relevant to an understanding of the present invention described herein:

General reference for single and multi-slit interference: *Fundamentals of Optics*, Jenkins and White, McGraw-Hill, 1950, Chapters 13, 15, 16, 17, and especially Sections 17.1, 17.2, and 17.3.

General reference for multi-element interference, the Fourier transform of them, and circular aperture formulas. *Fourier Optics: An Introduction*, E. G. Steward, Ellis Horwood Ltd., Publisher, Halsted Press/John Wiley & Sons, 1987, Chapters 2 and 4, and Appendix C.

*CD ROM The New Papyrus*, S. Lambert, S. Ropiequet, Eds., Microsoft Press, 1986.

*Principles of Optical Disc Systems*, G. Bouwhuis, J. Braat, A. Huijser, J. Pasman, G. van Rosmalen, K. Schouhamer Immink (all at Philips Research Laboratories, Eindhoven), Adam Hilger Ltd., 1985.

Also related to certain aspects of this invention are my prior U.S. Pat. Nos. 3,891,794 issued Jun. 24, 1975, and 4,090,031 issued May 16, 1978, disclosing systems data recorded in multi-layered optical records.

SUMMARY OF THE INVENTION

Therefore, it is an object of the present invention and of my earlier filed co-pending U.S. patent application Ser. No. 07/410,943 to provide an optical storage system for increasing the amount of data that can be recorded and retrieved from a given area of the optical storage medium, i.e., increasing storage density, increasing the data rate, and at the same time facilitating tracking, focusing and synchronization. The basic principle of the present invention is to encode the information that is to be recorded by forming related sets of variably spaced marks on the optical record. Each such set of such marks when illuminated with coherent light causes an optical interference pattern consisting of a distribution of amplitude maxima separated by amplitude nulls or minimas that change in accordance with the encoded information. As an example, two or more slits or holes may be formed as a set of marks in the record at each data location. A source of coherent light directed at this set of marks produces an optical interference pattern having the above characteristic maxima and minima. In accordance with the present invention, the information data, for example, $S_i$, which may be sampled data or a sampled analog signal, is encoded as a function $f(S_i)$ by variably controlling the separation between two or more marks of the set on the optical storage record. Thus, in the recording process, the set of physical marks, for example, two or more slits or holes, are controllably spaced so that during read the resulting optical interference pattern has detectable spacing between maxima, or minima, that varies with the information content of $S_i$. This pattern information is detectable as an output signal being a predetermined function g of the encoded information, i.e., $g(S_i)$.

The information signal $S_i$, when extracted from the function g, is essentially in analog form having a continuum of values. It ($S_i$) is thus capable of storing analog information, for example, of a value varying continuously from 0 to 1000. Alternatively, $S_i$ can represent 1000 digital values in discrete steps. Therefore each set of marks on the record track contains an order of magnitude or more information than in the single physical mark storing one binary data bit in existing optical storage systems. Although the process of the invention is basically analog, the data recorded and retrieved may itself be digital, including binary, by initially encoding the digital data into the form of an analog signal which is recorded. The retrieved analog signal is then discretely decoded back into digital at the output side of the read subsystem.

Also, it is important to note that the recording and retrieving process of the invention, although basically analog, has certain features and advantages of a digital recording operation. The data is recorded and retrieved by a set of marks on the optical image that are either present or absent, making error detection easier and more reliable. The integrity of the encoded information is contained in the interference pattern itself, which is determined by the location of the average centroid of the marks, not in the clarity or edge definition of the marks. This feature results in a system that enables record duplication using existing optical copying techniques to reproduce records with substantially 100% retention of signal-to-noise quality, much like that available in the reproduction of records recorded with digital processes.

In a preferred form of the invention, a set of three marks are formed on the record for each information storage location. The physical orientation and spacing of the three mark set is such as to produce an interference pattern similar to a two mark set, but with a somewhat sharper definitional pattern of maxima and minima. Furthermore, in a three mark set, the always present centermark facilitates the use of certain focusing, tracking and synchronization techniques described in greater detail hereinafter.

While the number of marks in each set is a minimum of two and, in the preferred embodiment three, it is recognized that more marks are required at each data location than the single mark associated with a single bit of information in the conventional optical storage systems. However, even though an extra one or two marks are required at each data location for the present invention, each set of marks will represent many, e.g., several hundred or more information values because of the ability to encode significantly more information values into the variably optical interference pattern than in the single data bit mark of conventional optical recording.

In the preferred embodiment of the invention, retrieval of the recorded information is achieved by illuminating each set of marks that are arranged, for example, transverse to the scan direction, e.g., along a record track, by a laser diode source and sensing the resulting optical interference pattern by an array of semiconductor photosensors. For example, in one preferred embodiment described herein, an array of photodiodes are located at known distances from the center line of the recorded track, as determined by a tracking subsystem. The movement of side maxima (side lobes) of the resulting optical interference pattern varies the output signal from the photodiode array and thus produces a varying output signal $g(S_i)$ representing the previously recorded information. Furthermore, in this preferred embodiment, the data are recorded serially in a spiral (or concentric) track on disc, as known per se, but unique to the present invention the data consist of the sets of marks that have variable information encoding spacing transverse to the track.

Furthermore, in the preferred embodiment, each record location will contain at least one mark for synchronization, focus and/or tracking. If no data is to be recorded at a particular location, then a single mark is made and the resulting read process produces a single central maxima which is readily detected. Since the detector system will not sense any side maximas (i.e., side lobes) when only the single mark is made, the system will recognize this reproduction signal as not containing any information data and that, in turn, facilitates tracking, focusing and/or synchronization. The central maxima also provides for continuous calibration of intensity and, as a reference for the center of the track relative to which a measurement is made of the variable displacement of the side maxima (side lobes).

As a further advantage provided by the above summarized invention, there is no need to embed or record a word sync as part of the data as in the case of many conventional optical systems. Each set of marks encoding the information in the present invention can represent, itself, a multi-bit word in the form of an analog value having a digital conversion to a multi-bit value. That multi-bit word or multiple value data set is clocked as a whole at the data location by the presence of the central light maxima. Furthermore, the accuracy of reading the information is very high compared to conventional optical storage systems. Since the output information during read provides a pair of first order maxima, each pair being an encoded representation of the information signal, two independent measurements (one for each side maxima) can be made of the output function $g(S_i)$ to yield the data value $S_i$. The accuracy of the readout is not as dependent on precise tracking as in conventional optical systems, as long as all marks of a given set are illuminated by the read beam. Accuracy of the readout does not depend on the size of the marks or their edge definition, only on their relative positions that determine the optical interference pattern. A missing mark from a set, for example, one out of two marks, will cause an error; however, ordinary digital error detection correction techniques can be used in such event in the same way as existing error detection systems.

Another aspect of the present invention is the encoding of the multi-bit words (sets of marks) in a wavelength (color) encoding scheme by which a plurality of data tracks are substantially superposed and the information content of such data tracks is separated out during read by wavelength (color) selective read optics and signal processing. In a preferred form of the wavelength (color) encoding, the plurality of sets of spaced apart marks are encoded in the same or different layers of optical storage medium that allows the separation of the superposed data tracks during read by selectively illuminating the record with different light wavelengths and detecting the resulting interference light patterns. Thus information encoded in a first data track stored in a first wavelength (color) selective storage medium, is retrieved by read optics that illuminate the record spots with a wavelength chosen to interact with the first color containing the first data track. The resulting retrieved interference light patterns emanating from the first data track yield the first data. The result is to store and retrieve multiple tracks of information superposed on the record in order to increase the storage density. For example, two, three or more data tracks can be stored in essentially the same area of the record by this process and then separately retrieved using the wavelength (color) selective read optics. Each multi-bit word within each data track forms the above described interference light pattern with the interval is between maxima and/or minima of the patterns representing the encoded information. Further background to this aspect of the present invention is found in earlier disclosed systems in my issued U.S. Pat. Nos. 3,891,794, issued Jun. 24, 1975; and 4,090,031 issued May 16, 1978.

A related alternative embodiment of the above is to employ simultaneous multiple wavelength light emitters that illuminate the superposed color differentiated tracks at the same time. Then multiple path color splitters divide the return light into different color constituents, one for each data track, and separate detectors respond in parallel to the interference pattern data from the respective tracks.

In a prefer-red implementation of the above wavelength selective encoding/decoding, slight differences in the depth of the color layers may cause some data to be out of focus. To correct for this effect, color responsive hololenses are used in the illumination optics.

Still another aspect of the present invention is the encoding of data again by substantially superposed data tracks storing multi-bit word marks at different selective focal depths, hence layers, of the optical record. In this case, the interference light patterns representing the encoded data of multimark sets are initially stored by a recording process in which each data track is located at a different depth within the record, separated by buffer or isolation zones such that the read optics can be selectively focused at the selected depth of the track within the material. Thus, for example, the illuminating light is selectively focused so that only one of a plurality of superposed data tracks is read at any given time. The separation between the datatracks is chosen so as to be greater than a measurement of the focal resolution of the illuminating optics so that the out-of-focus data tracks do not corrupt the information read from the selected track. Two, three or more data tracks are thus superimposed along the same read path of the transport mechanism to substantially increase the storage density of the record. In each case, the multi-bit marks of each word within a given data track develop the multi-lobe interference patterns that encode the data as described above. The recording of the tracks at the different focal depths is also related to prior systems disclosed in my above mentioned earlier U.S. Pat. Nos. 3,891,794 and 4,090,031.

BRIEF DESCRIPTION OF THE DRAWINGS

These and further features, objects and advantages of the invention will become apparent to those skilled in the art from the following detailed description and appended drawings.

FIG. 1 is a generalized functional block diagram of the writing (recording) process in accordance with the optical data storage system of the present invention.

FIG. 2 is another generalized functional block diagram of the wavelength/depth selective illumination and read operation of an optical record encoded in accordance with the system of the present invention.

FIG. 3 is a schematic diagram of superposed multiple tracks of recorded data using three mark data sets in each track in accordance with the preferred embodiment of the invention.

FIG. 4 is a schematic diagram similar to FIG. 3 but showing the information recorded using two mark data sets in the superposed multiple tracks omitting the center mark of each data set.

FIG. 5 is a waveform diagram of the optical interference patterns showing the encoded information signals $S_i$ and $S_k$ as a variable spacing between first order maximas of the interference patterns.

FIG. 6 is another waveform diagram showing a comparison of the wider envelope (solid line waveform) corresponding to the illumination of a single spot or mark (i.e., no data recorded) and, for comparison, the interference pattern (dotted line waveform) that results from reading multiple mark data set.

FIG. 7 is an isometric view of a preferred form of the drive mechanism used in the present invention in which the recorded information is formatted as a continuous spiral track on an optical disc record and in which the read optics retrieve the optical interference pattern by means of illumination of and reflection from one side of the record disc.

FIG. 8a is a schematic of the write optics suitable for recording onto an optical disc used in the drive of FIG. 7.

FIGS. 12c, 12d and 12e show in greater detail certain of the circuit components used in the synchronization, tracking and focusing controls for the read electronics of FIG. 12b.

FIG. 15 is a graph of the wavelength selectivity (rejection) of the light filters used in the record layers of the record shown in FIG. 14.

DETAILED DESCRIPTION OF PREFERRED EMBODIMENTS

Figure 8B:
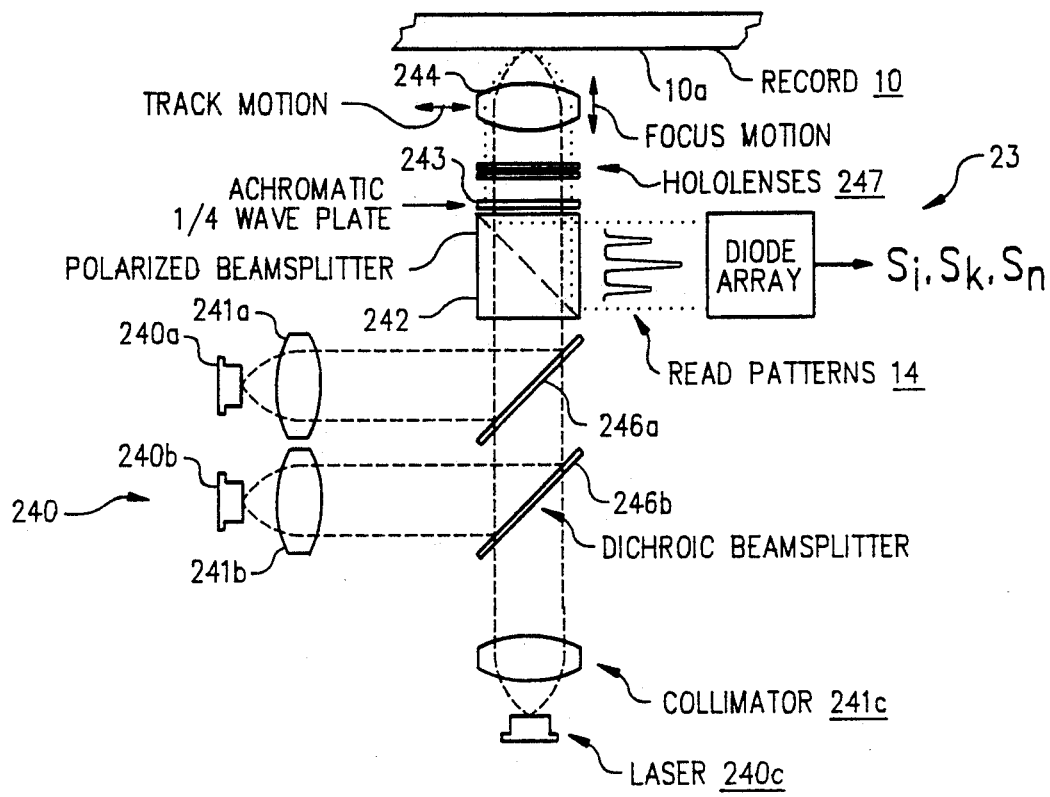
FIG. 8b is another schematic illustrating the read optics used in the drive of FIG. 7 for reading a prerecorded k on the optical disc.

The principles of the recording and reading apparatus and methods of the invention are illustrated by the functional block diagrams in FIGS. 1 and 2 in which a signal $S_i$ containing information to be recorded and later retreived is encoded onto an optical data disc 10 in the form of sets of marks 12 that develop an optical interference pattern 14 (see FIG. 2) when illuminated during a read operation by a coherent light source. This broad aspect of the invention is also disclosed in my related copending U.S. patent application Ser. No. 07/410,943 now U.S. Pat. No. 5,056,943.

While a variety of recording subsystems may be used, for which specific examples are described below, FIG. 1 shows in generalized form the write optics 15 in which the input signal information $S_i$ is applied to an electro-optical beam splitter and deflector 16 to receive a source of recording light 18, preferably from a coherent source such as a laser diode, and operating on the source light beam to divide it into at least two and preferably three distinct light beams 20. The angular separation of the beams 20 is a function of the input signal information $S_i$ so that in effect the beam splitting operation is modulated by the instantaneous value of the information stream. Arranged to be illuminated by the split recording beams 20 is the optical record 10. The variable split recording beams 20 produce a Bet of marks 12 that are spaced by a function $f(S_i)$. The material forming optical record 10 is any of a variety of known materials, such as a synthetic base provided with a surface coating of photoresist, that are known per se to form physical marks, such as alternating reflective and non-reflective spots, when exposed to light and then developed by chemical processes. Although it is known to record information by deflecting optical beams in response to the information signal to be recorded, the present invention departs from conventional optical storage technology by encoding the input information in sets of marks 12 that are later read as a unified set.

The recorded input information is stored as a variable dimension $g(S_i)$ of an optical interference pattern 14 produced during the read operation as shown on FIG. 2. More particularly, the optical interference pattern 14 contains a function of the input signal information in the form of the quantity $g(S_i)$ in the separation between certain maxima or lobes of pattern 14. Here the recorded information is stored as a function of the variable separation between a center maxima 14a and one or both of the first order side maxima 14b and 14c of interference pattern 14. To develop interference pattern 14 from each set of marks 12 on record 10, the read optics 23 includes a coherent source of reading light 24 which produces a read beam 25 that illuminates each set of marks 12 along a track (usually the track will be normal to the axis of the multiple marks 12) so that the waves of coherent light are constructively and destructively combined in a space adjacent record 10, in this instance on the opposite side of record 10 from source 24. The result is the optical interference pattern 14 which may be detected at selected planes parallel to record 10 by a photodiode detector array 26. Array 26 develops output signal information that represents the function g of the recorded and retrieved input signal information $S_i$ by sensing the variable separation of the maxima lobes 14a, 14b and, if desired, 14c.

It is observed that the set of marks 12 in FIGS. 1 and 2 has the capability of storing an infinite continuum of information values as a function of the variable spacing between the interference pattern maxima 14a, 14b and 14c. In most conventional optical storage systems, the information content stored on an optical record is in the form of a single mark representing a single bit of binary. In other words, the single mark of conventional storage records is either present or not present and represents a binary 1 or 0 value. A large number of such individual marks are required to form multi-bit words and many words are then in turn combined to form useful data streams. In contrast, the present invention as illustrated in FIGS. 1 and 2 records a set of marks 12, in which a minimum of two marks are required and preferably three are used as illustrated here, to form an analog recording of the information content by the variable lobe or maxima spacing of the resulting read interference pattern 14. For example, given existing electro-optical equipment, each set of marks 12 may encode a range of up to 1000 values with only three discrete marks 12 at each data location on record 10. In practice, a track of information will be recorded as best seen in FIGS. 3 and 4 consisting of sets of marks, such as micron sized holes in the optical record, with each set of marks arranged transverse to the axis of the track 28.

Also, as shown in FIGS. 1 and 2, another aspect of the present invention is to increase the density of the stored information on optical record 10 by recording in different layers or in different wavelength selective materials, two or more substantially superposed data tracks and to selectively read the information from the different data tracks by using wavelength (color) selective filters and/or change of focal depth optics. Thus, in FIG. 1, record 10, in addition to recording the first information signal $S_i$, another data track having multiple sets of marks 12 is superposed with second information here being a data signal $S_k$. The information signals $S_i$ and $S_k$ are each stored as the spacing of marks in a multi-mark set with the resulting interference patterns being read to retrieve the information content. Thus as shown in FIG. 2, the second data track signal $S_k$ develops another separately read interference pattern shown in dotted lines and decoded using selective wavelength or depth of focus changing optics (described hereinafter) to differentiate between the interference patterns resulting from the separate data tracks. Thus the solid line multi-lobe interference pattern 14 shown in FIG. 2 results from the first data track storing signal $S_i$ as a function $g(S_i)$ while the dotted line interference pattern, which has a somewhat different set of interference lobes stores the information $S_k$ in the second data track and produces the function signal $g(S_k)$. The functions $g(S_i)$ and $g(S_k)$ are selectively and separately read and processed in the photodiode detector ray 26 to produce the separate signal tracks $S_i$ and $S_k$.

Figure 14:
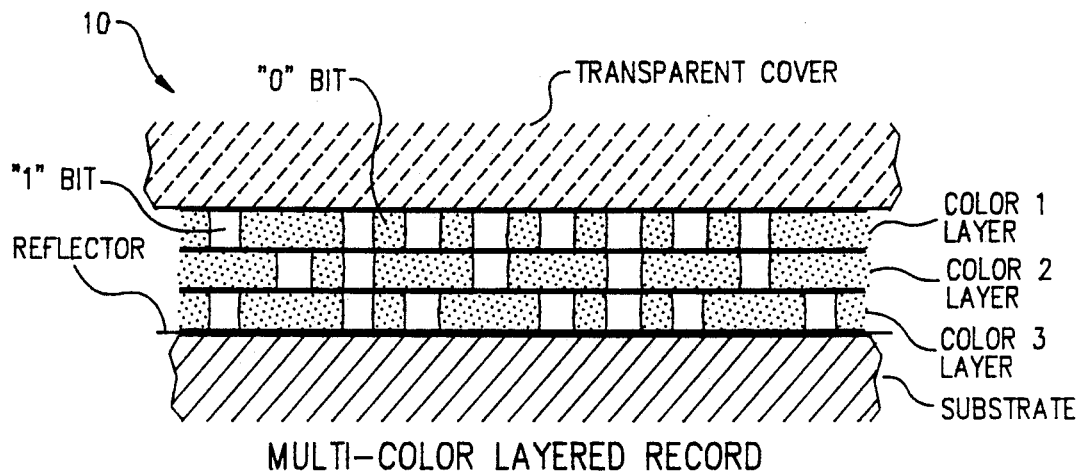
FIGS. 14 is a cross-section of a multi-color layer record for encoding the multi-bit word marks shown diagramatically in FIGS. 3 and 4.
Figure 16:
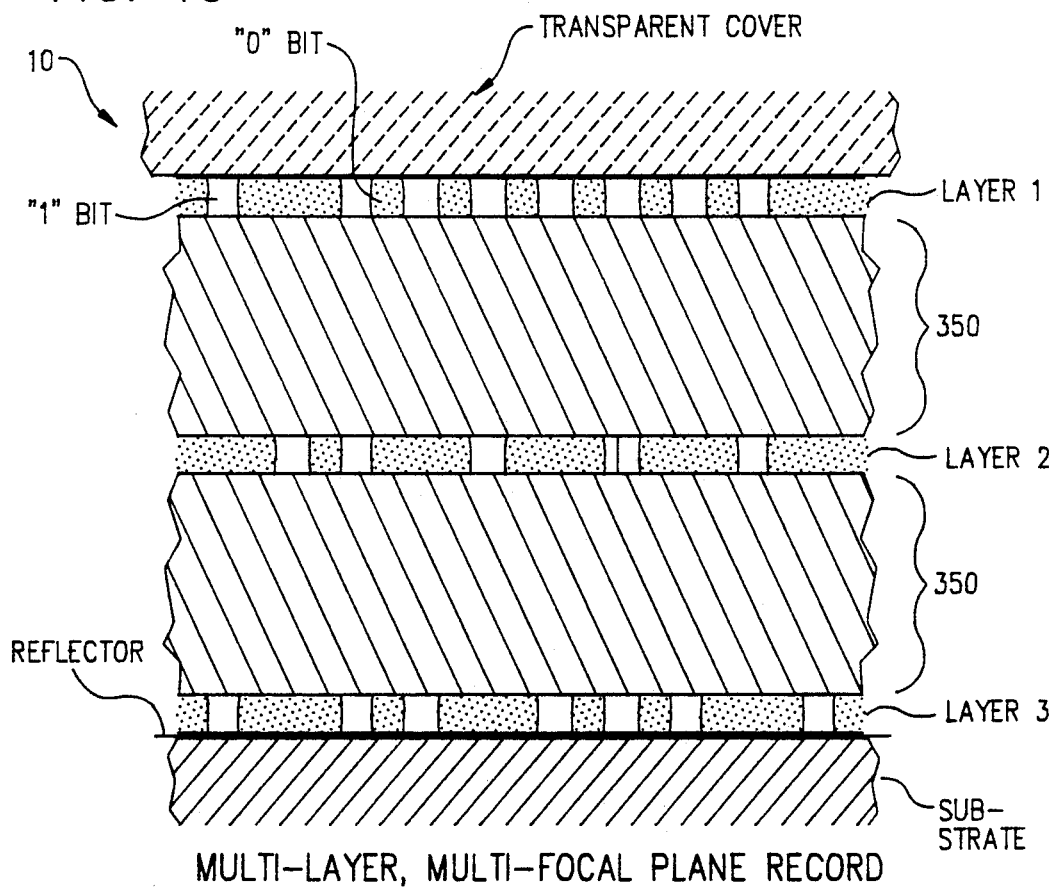
FIG. 16 is a cross-section of the alternative embodiment having multiple superposed data tracks stored at substantial separation depths so as to be read by changing the focal depth of the illuminating read optics.

In one preferred embodiment of this invention, the separate but superposed data tracks are stored in record 10 using a wavelength or color selective scheme in which the information signals $S_i$ and $S_k$ are separately encoded and retrieved from the record 10 by a multicolor, layered record shown diagramatically in FIG. 3 and in physical cross-section in FIG. 14. The layering of the data tracks enables each track to be built up on successive depositions on a substrate. Different wavelength (color) selective and associated wavelength rejection properties of each layer permit the read optics to selectively read the different data tracks, respectively storing two separate data signals $S_i$ and $S_k$. In another alternative embodiment, the different data tracks $S_i$ and $S_k$ are also stored in different layers as illustrated in FIG. 16, but with the addition of a dead zone or isolation band of optically inert material separating adjacent layers sufficiently to enable different focal depths of the read illumination optics to retrieve the information by selective changing of the focusing servo. Each of these embodiments are based on the essential concept of a plurality of substantially superposed data tracks, each containing information encoded with multi-mark sets storing the information as retrievable light interference patterns.

FIG. 3 shows the preferred three mark set 12. A plurality of mark sets are formed along track 28, with each set disposed crosswise of the track so that a center mark 12a is always present at the middle of the track for use in tracking, focusing and/or synchronizing.

Also, as shown in FIG. 3, the first track 28 is recorded in a first layer 1 of record 10 (compare FIG. 14) and stores the first information $S_i$ in the form of the functions $f(S_i)$ and $g(S_i)$ as illustrated. This first track 28 is superimposed on a second data track 28' which is stored in layer 2 (again, compare FIG. 14) and also consists of multi-set marks disposed crosswise of the track direction. In the latter case, the marks are different from that of track 28 as they record different information, namely information signal $S_k$ in the form of the function $f(S_k)$. Together, the record tracks 28 and 28, store the functions $f(S_k)$ and $g(S_k)$. Additional data tracks may be stored on record 10 as, for example, shown in FIG. 14 and as indicated by layer n schematically shown in FIG. 3. Of course, there are practical limits in certain embodiments to the number of tracks and data layers that can be encoded on a single record 10 since the present invention envisions the use of read optics that illuminate all the layers of the record at one read location relying on wavelength filtering and/or depth focusing to separately retrieve the data from superposed tracks as summarized above.

FIG. 4 shows an alternative encoding record 101 using two marks per set 12'. In the embodiment illustrated in FIG. 4, the center mark is omitted whenever data is present.

The alternative embodiment of FIG. 4 uses the two mark sets to encode the multiple tracks 28 and 28' in substantial superposition in different layers, here being layers 1 and 2. Each track is thus made up of a plurality of word sets, each set having two marks and, when read, causing the formation of a multi-lobe interference pattern in a manner similar to the three mark embodiment of FIG. 3. Although not shown in FIG. 4, the record 10' may also involve additional layers each containing a separate information track such as contemplated by the additional layer n for the three mark data track record shown in FIG. 3.

Referring again to FIGS. 1 and 2, it will be observed that the physical spacing of marks 12 at each data or value set on record 10 is an encoded form of the input information $S_i$ recorded as a predetermined function of $S_i$. While it might be theoretically possible to retrieve the recorded information directly by conventional forms of magnifying and measuring the physical separation of marks 12 from record 10, the present invention is unique in that the marks 12 are recorded at a very high density, and thus with minute separation in a range of 2 to 4 times the wavelength $\lambda$ of the read light beam. For example, using an aluminum gallium arsenide laser diode, having a $\lambda = 0.78$ microns, the marks 12 of each set have a separation of about 1.56 to 6.24 microns. Retrieving this information from the record using conventional optics and electro-optics is difficult at best, and undesirable because of the requirement of very expensive and sophisticated read optics. Because of the high density recording of marks 12, the spacing is on the same order of magnitude as the wavelength of the light used for reading (source 24). As such, conventional imaging processes do not provide optimum resolution of the marks 12 when imaged on a photodetector or other light sensing detectors.

In the present invention, the minute spacing between the multiple marks 12 is used to advantage by forming a light interference pattern which uniquely retrieves the spacing information from the multiple marks of each record set 12 in the form of the interference pattern maximas and minimas. Three marks, such as a three slit set, produce a strong center maxima 14a and two relatively strong first order maximas 14b and 14c at equidistant opposite sides of the center maxima. By intercepting the interference pattern at a suitable plane offset from record 10, the spacing between these maxima is translated into an information output signal. The signal may be derived from the variable spacing between a center lobe 14a and one of the first order side lobes or maximas 14b as illustrated in FIG. 2. Alternatively, the information content may be derived by the spacing of two $g(S_i)$ representing the overall separation between the first order maximas, or redundant measurements can be taken for the single value function $g(S_i)$ measured from the center maxima to each first order side maxima and an average taken of the two readings.

The exemplary light interference readout pattern is more specifically shown in FIG. 5. The shape of this pattern includes a large center maxima 14a and a pair of first order maxima 14b and 14c spaced symmetrically and at the same function distance $g(S_i)$ on opposite sides of the center maxima 14a. The relative amplitude of the first order side maxima 14b and 14c are roughly ½ to ⅓ of the center maxima 14a in the case of a three mark set. There are, of course, additional maxima that extend at greater distances from the center lobe on both sides and with diminishing amplitude; however, the useful side lobes for most practical purposes are the first order maximas 14b and 14c. In the alternative system using a two mark set for each data location, the side maxima are less sharp, although still useable.

The detailed shape of the interference pattern is determined by three effects: the effect of a single aperture, the effect of several apertures in concert, and a cosine term for the drop-off in intensity with angle. The equation describing the pattern therefore has three terms.

The first term, the single aperture term, is usually derived from the assumption of a single slit of infinite extent and a width of a few to many wavelengths. See Eqn. 1 from, for example, E. G. Steward, *Fourier Optics: An Introduction*, Halsted Press, 1987, p. 37, or from F. A. Jenkins and H. E. White, *Fundamentals of Optics*, second ed., McGraw-Hill, 1950, p. 282.

Whenever the read beam 25 scans across a single mark such as the no data center marks 12a in FIG. 3, the resulting light output sensed by the detector array is a single, relatively wide waveform (solid line in FIG. 6) without the intervening nulls (signal minima) that are characteristic of the interference pattern 14 (shown for comparison by dotted lines in FIG. 6). The shape of the wider output waveform without alternating maxima and minima that results from scanning across a single mark is used to advantage in the preferred embodiment of the present invention for tracking and focusing control as described herein in connection with FIGS. 9 and 12B. It is observed in FIG. 6 that the solid line representing the waveform output from a single mark read is shown in superposition with the dotted line interference pattern 14 for comparison only and these two patterns did not normally exist at the same time, rather the patterns would alternate between the solid line wave form representing a read scan across a single mark followed by a read scan of a multiple mark set producing interference pattern 14. Thus, as described more fully hereinafter, detectors located to read the centermost portion of the output waveform as well as locations on either side of such waveform enable the control electronics to detect a transition between the wider solid line waveform 36 in FIG. 6 and the multi-set interference pattern waveform 14. By processing the resulting detector output signals, tracking, synchronizing and/or focusing control signals are developed.

The intensity of the output light in waveform patterns 14 and 36 is a function of the size of the marks. For example, if the marks take the form of apertures in a transmissive read system, the strength of the output light transmitted through an aperture increases with its size. However, the encoded signal information in the function $g(S_i)$ will be independent of the size of the marks and will only vary with the spacing between the centers of each mark in the set. Furthermore, the edge definition of the marks will not significantly influence the encoded spacing $g(S_i)$ so that the encoded information and its retrieval is not significantly degraded by the sharpness of the marks formed on the record.

DISC RECORD DRIVE

In the preferred inplementation of the present invention and by way of illustrating the principles of the invention, data is recorded serially in a spiral track by an optical disc providing record 10 as shown in FIG. 7. The drive 40 for disc record 10 includes the customary disc motor 42 and spindle 44 for spinning record 10 at a controlled angular velocity. A carriage 46 slidably mounted on carriage tracks 48 movably supports the read and/or write optics 15/23 which include an objective lens arranged close to but not in contact with a surface of disc record 10. Optics 15/23 with its objective lens thus moves along a radial path with respect to the axis of disc record 10 writing onto or reading from a spiral track, or a series of concentric ring tracks, on disc record 10 as it is spun by motor 42. Alternative drives with different recording formats are contemplated and are described later in the description of alternative embodiments.

The recording on record 10 can take various forms; however, in the preferred embodiment the data is encoded in the form of reflective and non-reflective spots on one or both surfaces of the disc. As described below in connection with FIGS. 8A and 12A, the recording operation will normally involve making a master record by exposing a photoresist coating on a glass master disc with the writing beams. After writing the master disc, it is developed by etching away the photoresist to leave minute regions along the track where the surface is reflective. As exemplary dimensions, the width of a three mark data track, as it is illustrated in FIG. 3, would be about 4 microns. Each spot or mark such as marks 12a, 12b, and 12c forming a set would be on the order of one micron across. The spacing between marks would be on the order of ½ to 1 micron. The photoresist mastering process is known per se in recording data onto Compact Discs and the related laser discs. After mastering, there may be one or more intervening submasters made called "stampers" that are in turn used to form useable copies. The copies may be made from synthetic semi-rigid materials such as polycarbonate, which is a known transparent plastic used for making Compact Disc copies used in consumer equipment.

WRITE OPTICS

Drive 40, as shown in FIG. 7, may include write optics 15 with or without read optics 23 on the same carriage 46. Preferably, the writing operation will be performed by relatively high-precision, non-consumer equipment in which the tolerances of the components and the servo controls are precise for mastering. Then copies of the record can be made from the master or from "stampers" and played back on less expensive, lower tolerance drives having only read optics 23 mounted in carriage 46. Nevertheless, both read and write optics may be mounted in the same carriage in a side by side arrangement or with shared optics if desired.

Now with specific reference to FIG. 8A, the write optics 18 includes a laser diode 180 producing a polarized light beam that is then shaped by collimator 182 and passed through a beam divider and deflector assembly 183 where the light source is divided and angularly modulated in response to the data or information signal source $S_i$. The divided and modulated beams are then passed through a polarized beam splitter 184, ¼ wave plate 188, and objective lens 189. Reflections from the write beam are deflected by splitter 184 to focus module 185 including conventional astigmatic optics 186. Module 185 produces feedback control signals, i.e., error signals, at output 187 that are applied to focus control electronics shown in FIG. 12a and described in more detail below.

The write light beams impingent on surface 10a of record 10 appear as beams 20 having variable angular divergence or convergence as shown in the recording process of FIG. 1. The objective lens 189 is movably mounted by conventional means, not separately shown, for both to and from displacement relative to record surface 10a for focus and in a plane parallel to surface 10a for tracking as indicated by the double headed arrows adjacent objective lens 189.

Figure 17:
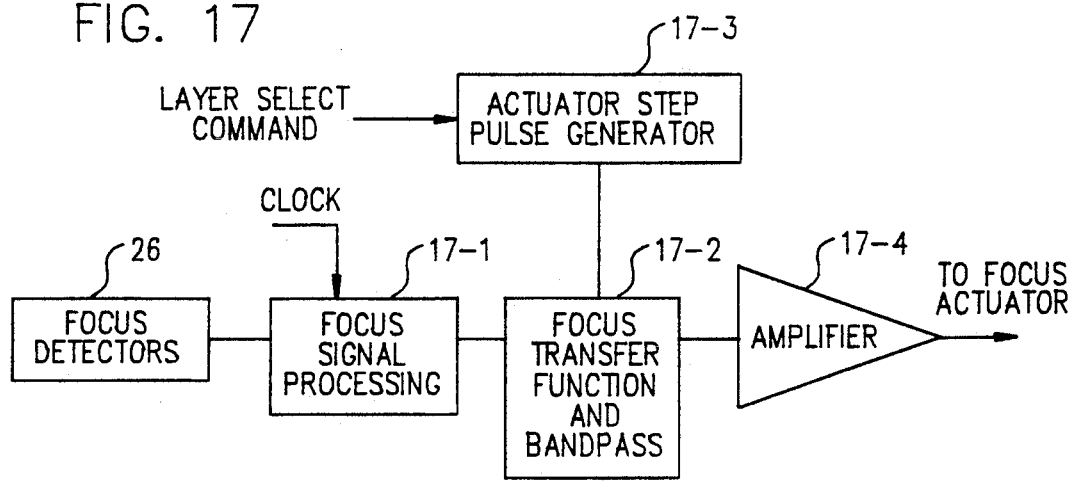
FIG. 17 is a block diagram of the track-focus selection control for the layered record shown in FIG. 16.

The beam divider and deflector assembly 183 can take various forms as described below herein in connection with FIGS. 17-21; however, it is preferred that an acousto-optic deflector be used as shown in FIG. 17 and described herein in detail in connection with that figure.

In the operation of recording optics 18, three output beams are generated when forming the three mark set 12 according to the preferred embodiment of FIG. 3, described above. As previously mentioned, the recording system is basically analog in that the spacing of the physical marks on record 10 are continuously variable in a range of variable spacing crosswise of the record track.

In the preferred embodiment, the information signal is encoded only in the variable spacing of marks within a set of such marks arranged transverse of the record track 28 as best shown in FIG. 3, above. However, alternative embodiments are discussed hereinafter in which additional information is stored by encoding data in variable spacing along the track as well as transverse to the track.

After mastering a record and making useable copies, it is preferable that the record surface containing recording be protected by a relatively thick transparent coating material to keep dust, scratches, etc., from degrading the read operation. Such a coating is known per se and is used on conventional Compact Discs in the form of a 1.2 mm layer of polycarbonate. For the write operation, the optical system must be of high quality with a relatively large NA (numerical aperture). This is because the system must make spots (marks) on the record that are on the order of one micron or so in diameter. Objective lens with an NA of 0.5 is preferred for recording marks of one micron.

Figure 12A:
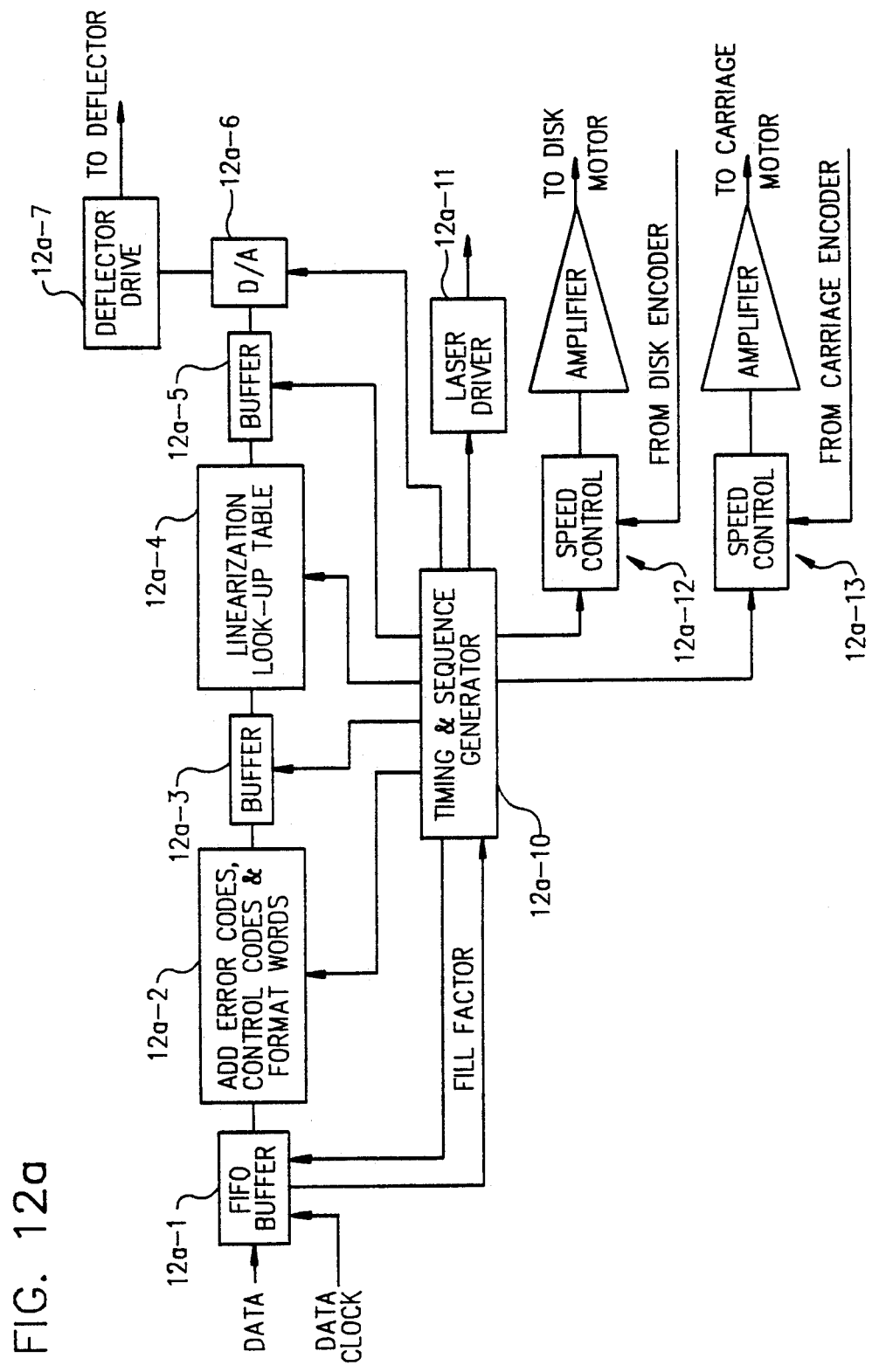
FIG. 12a is a detailed block diagram illustrating a suitable control subsystem for governing the operation of the write optics of FIG. 8a during encoding of data and recording of the optical disc.

During write operation, drive 40 and write optics 18 are governed by the write control subsystem shown in FIG. 12a. Tracking for write operations in the preferred embodiment uses conventional control technology. While a number of alternatives exist, the preferred embodiment as shown in FIG. 12a has an FIFO buffer 12a-1 into which data is entered at a clock rate, combined with error codes, control codes, and formatted in processor 12a-2, rebuffered at 12a-3, passed through a linearization look-up table 12a-4, buffered again at 12a-5, and then applied through a digital to analog converter 12a-6 to the deflector driver 12a-7 that controls the write optics shown as beam divider and deflector assembly 183 of FIG. 8a. These components are timed and sequenced in a conventional fashion by a timing and sequence generator 12a-10 which is also coupled to the laser diode driver 12a-11 and to the disc drive motor control 12a-12 and carriage drive control 12a-13. The controls of FIG. 12a are essentially the same as used for recording Compact Disc masters. Alternative recording optics and associated controls are mentioned below in the section dealing with alternative embodiments.

In forming the multiple mark sets as they are shown in FIG. 3 by means of the write optics 18, it is preferable that each set of marks 12 nearly touch the adjacent sets. This will maximize density and still enable adequate signal-to-noise ratio during read. As described below in connection with the read operation, the close spacing of the mark sets along the track 28 means that the read beam is preferably oval in shape with the major axis oriented crosswise of the track as depicted by the dotted line oval of read beam 25 in FIG. 3.

The recording optics 15 of FIG. 8a is also used to form the record 10 having wavelength/depth selective superposed data tracks. By successive build-up of record layers using optics 15 to encode data in the track of each layer in succession and servoing optics 15 to follow the same record path in each instance, the record 10 is built up to the desired number of layers and hence record data density.

READ OPTICS

A preferred implementation of read optics 23 is shown in FIG. 8b. At least one laser diode 240, which for example, may be provided by an aluminum gallium arsenide diode, emits coherent light of wavelength on the same order of magnitude as the dimensions of marks 12 on record 10. The coherent light is shaped by collimator 241 and passed through a polarizing beam splitter 242, a one quarter wave plate 243, and a movably mounted objective lens 244 that focuses the beam on record 10. As mentioned, it is desirable that the read beam be of generally oval shape arranged with the major axis crosswise to track 28 as shown in FIG. 3 and this requirement is readily met by most laser diodes because they inherently produce an oval beam. Reflections from the marks on record 10 are returned through objective lens 244 back to the polarizing beam splitter that now reflects pattern 14 on the diagonal. Photodiode detector array 26 is arranged to intercept the reflected output read pattern which contains the multiple lobes or maxima 14a, 14b and 14c as shown in FIG. 5.

The quarter wave plate 243 is known per se to prevent reflections from the optics and/or record 10 from getting back into the laser diode and interfering with its operation. The plate 243 also holds losses in beam splitter 242 to a negligible amount.

For a multi-layered, color record 10, the preferred read optics 23 employs a plurality of different wavelength light emitters, shown in FIG. 8b as lasers 240a, 240b and 240c. These are sequentially or alternately operated so that only one is emitting at a time during read, and the wavelengths of the lasers 240a, 240b and 240c are selected according to the optical wavelength properites of the record to illuminate just the color layer, e.g., layer #1, #2 or #3 that is to be read out during a given time window. The sequential light beams from these lasers are directed into the same optical path by collimators 241a, 241b, and 241c and dichroic beam splitters 246a and 246b with the resulting emissions passing through polarized beam splitter 242 on to illuminate the record 10. Hololenses 247 provided between ¼ wave plate 243 and focus optics 244 compensate for depth of field of the different color layers in the record 10 as described herein in connection with FIG. 13. The return light of the interference patterns is split off toward diode array 26 and the data for each track is read one track at a time by the diode array 26 and associated processing electronics shown in FIG. 9, 10 and 11.

An alternative to the above described read optics 23 of FIG. 8b for a layered color record, the various wavelength emitters may be concurrently energized to illuminate the record 10 with a plurality of colors (if enough colors are used, white light results) and multipath detection of the return light is used to sort out the data from the different tracks. Thus, a multi-color return beam containing the co-mingled interference pattern data would be split off to impinge on different detectors, one for each return color.

Figure 9:
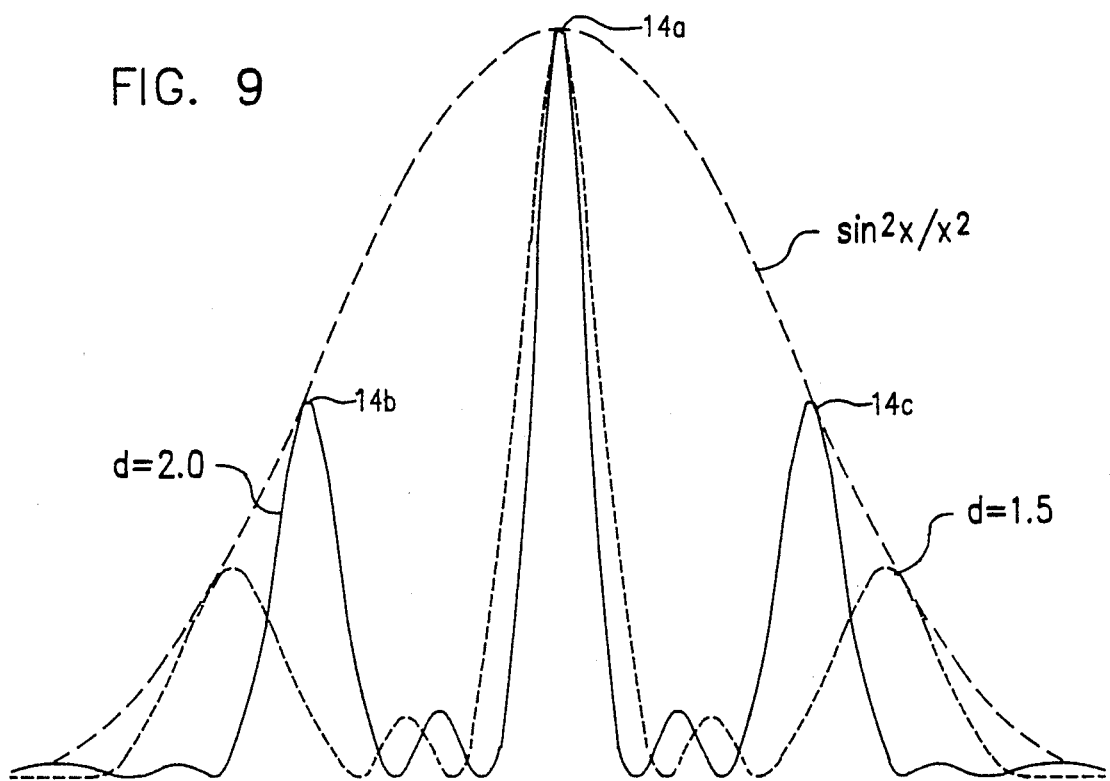
FIG. 9 is a diagram showing a suitable arrangement of the diode detector arrays disposed relative to an information encoded interference pattern that results from illuminating a multiple mark data set by means of the read optics shown in FIG. 8b in the drive of FIG. 7.

Diode array 26 may take various forms as described in different alternatives below; however, in the preferred embodiment the diodes are arranged as shown in FIG. 9 relative to the interference pattern 14 in groups consisting of a left linear array 261, a right linear array 262 and a group of diodes 263 arrayed along the track which will be called the vertical axis or vertical array. In particular, detectors 263 include a central reference detector 263a and a set of focus and sync detectors 263b and 263c arranged along the vertical axis above and below the central reference detector 263a. These detector diodes 263 respond to variations in the light reflection that occurs along the track as relative movement occurs between the read beam 25, as shown in FIG. 3, and the track, from one set of marks 12 to the next. The resulting output signals from these detectors are processed as described more fully below in connection with FIG. 12B to control the tracking, focusing and synchronizing of the read optics 26.

The left and right linear subarrays 261 and 262 include a plurality of juxtaposed diodes of sufficient number and arrangement to detect the range of lateral shifting of each side lobe or maxima 14a and 14b of the read pattern. The position of each lobe or maxima 14a and 14b is determined by sensing those diodes which are illuminated above a detection threshold and by measuring the ratio of intensity of diode pairs that straddle a particular lobe. The detection is thus partly digital in the sense that only certain discrete diodes are illuminated above the sensing threshold and is also partially analog in that the ratio of the diode signal strength measures position of the side maxima 14a and 14b.

The encoded signal data $S_i$ is extracted from the record by sensing the outputs from either or both of the left subarray 261 and/or the right subarray 262 which are at a known distance from the center of the track and hence at the center lobe or maxima 14a of the interference pattern. The dimension of each detector window in subarrays 261 and 262 is substantially smaller, in the direction of lobe movement, compared to the width of the lobe itself, i.e., lobe maxima 14b or lobe maxima 14c. On the other hand, in order to collect as much light as possible, each of the elements of subarrays 261 and 262 is much longer along the track direction than it is wide transverse to the track. While other configurations such as square or cylindrical lenses could be added to collect and focus light on the detector elements, the general geometry of elements of subarrays 261 and 262 of FIG. 9 is suitable. The detectors are preferably charge coupled devices and are accompanied by a transfer and shift register logic circuit such as shown in FIGS. 10 or 11 for extracting the signal data representing lobe movement from the read light pattern.

Figure 10:
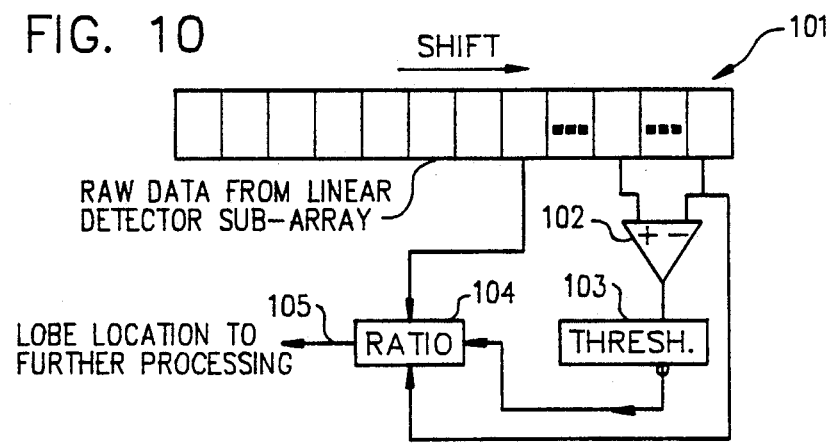
FIG. 10 is a logic circuit used to retrieve the lobe position information encoded into the light interference pattern shown in FIG. 9 by means of the diode array of the read optics shown in FIG. 8b.

The position of the side lobe (or lobes) is translated into an analog signal by a sensing control circuit such as shown in FIG. 10, including shift register 101, comparator 102, threshold detector 103, ratio circuit 104 and an output 105. Shift register 101 stores the positional information representing those particular diode elements of sub-arrays 261, 262 that have been illuminated with a side maxima 14b or 14c. The comparator 102 has inputs coupled to a certain spaced pair of elements of register 101 and an output connected through a threshold detector 103 to an enable input of ratio taking circuit 104 so that a raising signal level in shift register 101 elements, representing the raising edge of a detected side lobe, triggers threshold detector 103 and hence ratio taking circuit 104. The inputs to circuit 104 are connected to spaced elements of register 101 selected to span the anticipated width of the side maxima. As a result, ratio taking circuit 104 is tripped on a raising leading edge of a side maxima and the ratio output signal at 105 is a measure of the center point, i.e., peak, of the maxima (lobe).

Figure 11:
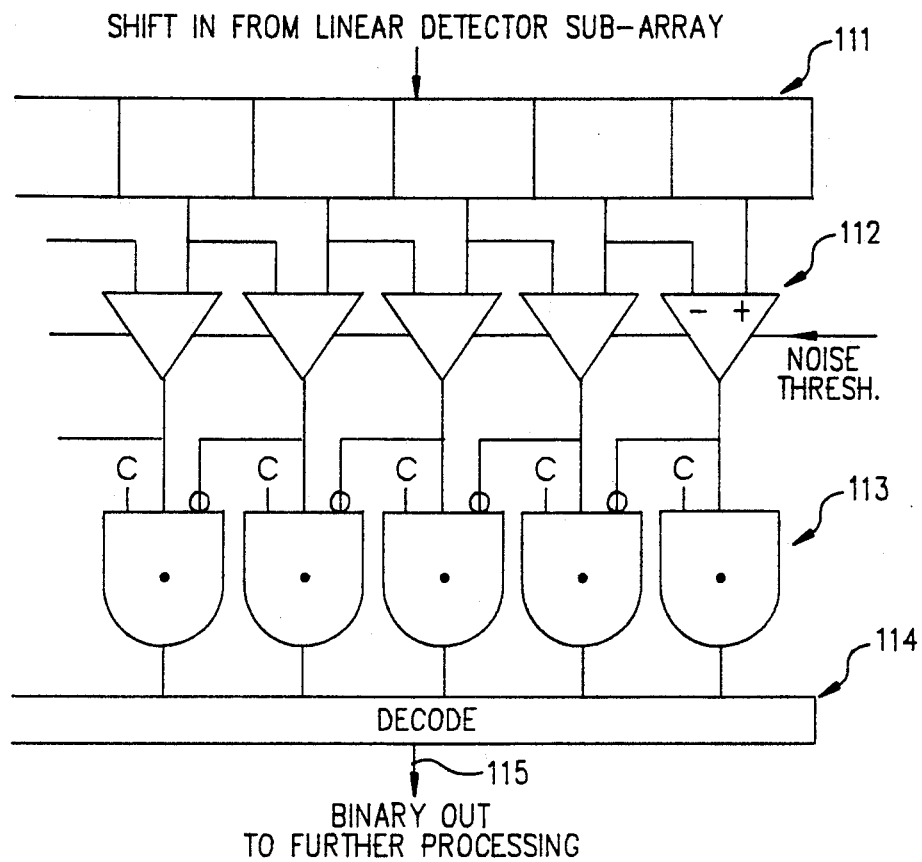
FIG. 11 is a simplified logic circuit showing an alternative signal processing scheme for retrieving the encoded data from the variable interference pattern of FIG. 9.

Alternatively, a circuit such as shown in FIG. 11 may be used for extracting the read data in which a parallel transfer occurs between the signal outputs from the diode elements of subarrays 261 and 262 into register 111. A bank of comparators 112 define the point at which the signal output from the detector array element starts to decrease, i.e., the peak of the lobe of maxima 14b or 14c. A row of AND gates 113 blocks the output of any downstream comparator 112 corresponding to an array element illuminated beyond the peak of the side lobe. The result is a multi-bit word at the combined outputs of AND gates 113 that is fed to a decode logic 114 which decodes the position word and produces a corresponding binary output representing the location of the peak of the side lobe 14b or 14c.

SYNCHRONIZATION, FOCUS, AND TRACKING DURING READ

Figure 12B:
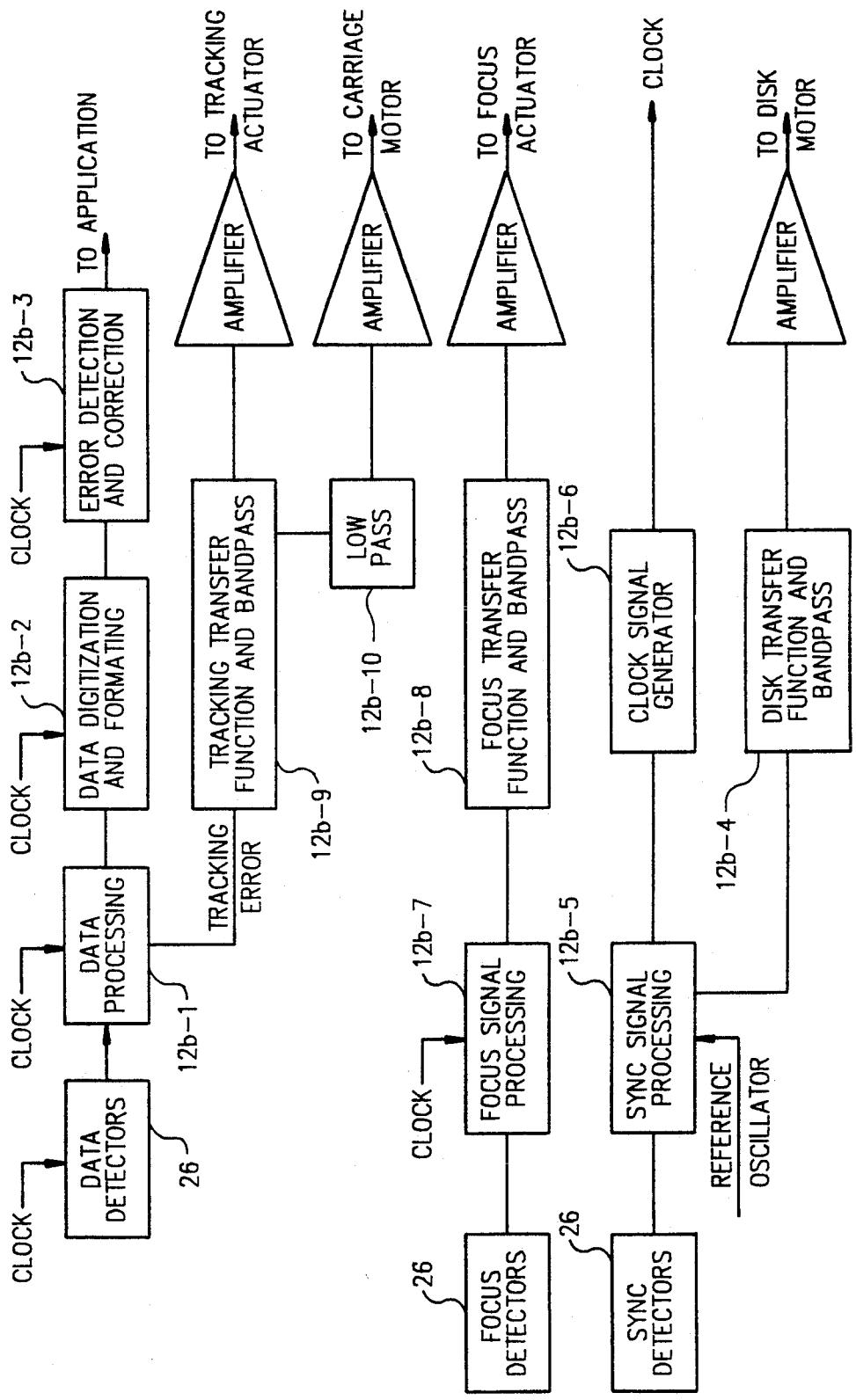
FIG. 12b is a block diagram of a suitable electronic control subsystem for operating the read optics of FIG. 8b during retrieval of data from the optical disc shown in drive 7.

A data word read from a set of marks will produce a multi-lobed pattern in a plane perpendicular to the track direction, as has been described. As shown in FIG. 12b, the data detectors of diode arrays 26 receive and process data at 12b-1 which may be implemented as described above and shown in FIG. 10 (or FIG. 11), and then conventional digitization and formatting of data occurs at 12b-2 followed by error detection and correction, 12b-3, again known per se. The thusly processed data is then output to the particular application equipment. At the same time, the light pattern in a plane parallel, i.e., longitudinal, to the track will be that of a single spot for each lobe. When the read beam is between sets of marks, the pattern in the longitudinal direction will be that of a very closely spaced two mark set, i.e., the side lobes will be very small and widely spaced, and the central lobe will be slightly larger but not as wide as a single spot.

Figure 12C:
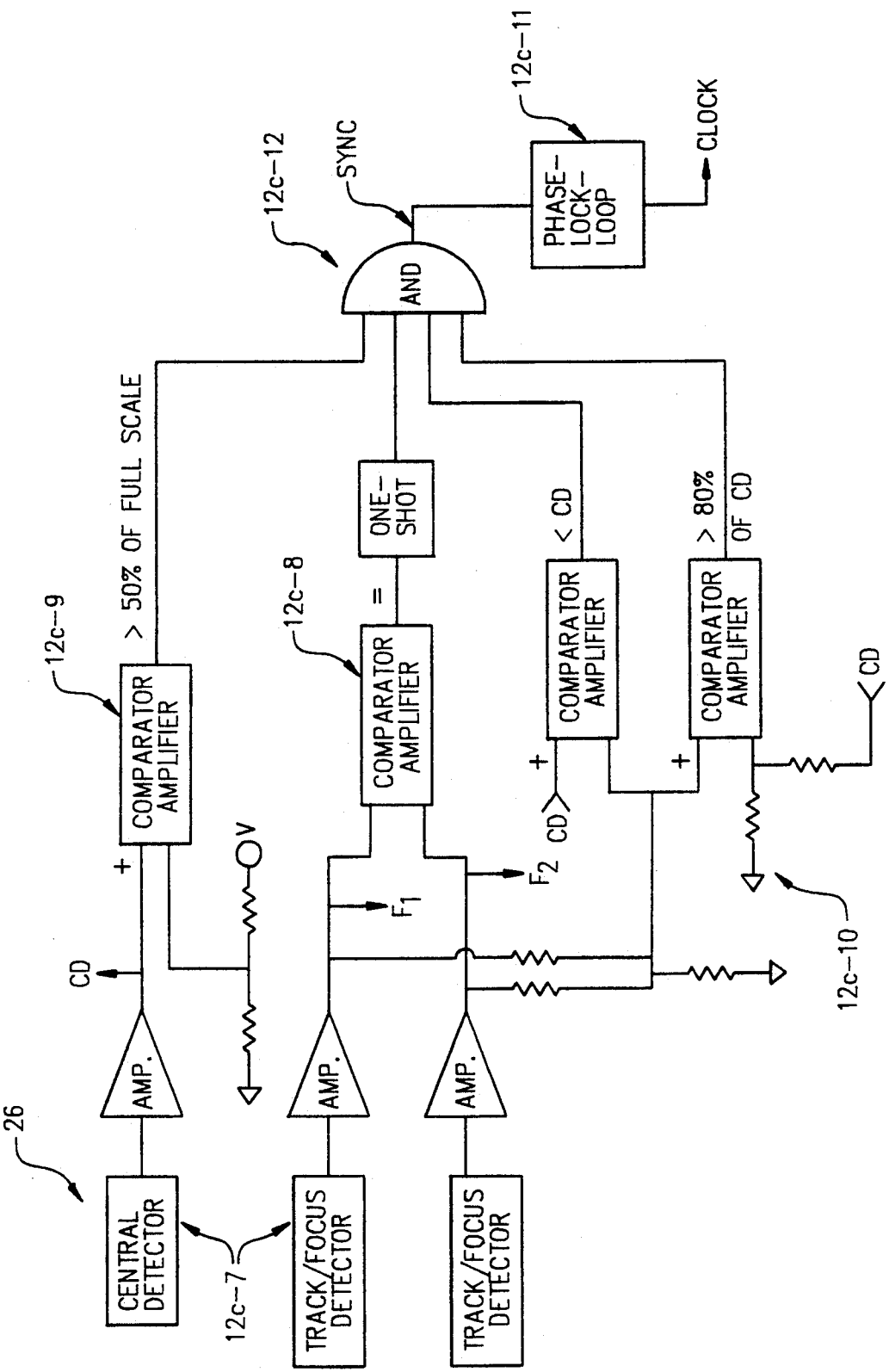

A synchronizing clock signal is developed by the sync signal processing shown generally in FIG. 12b to include sync detectors of array 26, processing 12b-5 clock generator 2b-6, and disc transfer function and bandpass 12b-4, and is shown in more detail in FIG. 12c. With reference to FIG. 12c, the sync detectors 12c-7 of array 26 are aligned parallel to the track, and are set so that when the beam is on the word, the detectors read the (one spot) central lobe, one on either side, at about 80% intensity points. Comparator amplifier 12c-8 between the track/focus detectors 12c-7 determines when the signals become equal and a pulse is then generated. If at the same time the central reference detector is high and larger than the sync signal as determined by comparator 12c-9, and the sync detector signal is at least half (ideally 80%) of the central reference as determined by comparators 12c-10, then AND logic 12c-12 determines that the signal condition represents a sync pulse, and it is passed on to the clock and timing circuits after stabilization by phase lock loop 12c-11. If the beam happens to be somewhere between words, the sync detectors may again be equal, but either the central reference will be low, or the sum of the sync detectors will be low, and no pulse will be passed on. Note from an examination of the pattern shapes as in FIG. 9 that the 80% intensity point on the single lobe pattern is about where there is a null in a two mark or three mark word.

Focus processing is shown generally in FIG. 12b as focus processing 12b-7, and focus transfer function and band pass 12b-8, and a suitable circuit for these functions is more specifically set forth in FIG. 12d. As shown in FIG. 12d, the focus detectors F, and F can be the same as the sync detectors 12c-7. When sync occurs, the sum of the detectors $F_1$ and $F_2$ is compared linearly by differential amplifier 12d-1 to the central reference. If the detectors are too close to the record, the lobe will be narrower relative to the fixed spacing of the detectors and the ratio of the sum to the central will be small. If the detectors are too far away, the lobe is much broader and lower and the ratio will be large. In practice, the sum of the detectors would be scaled with a resistor attenuator so that at correct focus the sum and the central will be equal. Then a simple differential amplifier 12d-1 will indicate by a positive or negative signal approximately how far and in which direction the focus is in error and this value is gated via clocked analog gate 12d-2 to produce the sampled focus error for controlling read optics 23. The selection of the focus is arbitrary, since there is no distinct image plane as there is in conventional systems. The "focal" point is chosen so that the pattern is sized to match a convenient detector spacing, and the beam wave front is convex.

Tracking is carried out by the data processing depicted generally in FIG. 12b by tracking transfer function and band pass 12b-9 and a low pass integrator 12b-10 to produce tracking error signals for the tracking actuator and carriage motor, and a more detailed showing of this processing is set forth in FIG. 12e. The tracking signal in FIG. 12e is advantageously extracted from the data signal by taking the difference via differential amplifier 12e-1 between the left and right sets of data detectors 26. The function of tracking is to keep the center of the read beam and the center of the track coincident. If the track wanders away from the beam, the pattern will appear to shift in the opposite direction, and the detectors will no longer be symmetrically disposed with respect to the pattern and a tracking error signal results which produces a correction in the tracking actuator. The output of differential amplifier 12c-1 is selectively passed by clocked analog gate 12e-2 to the output line producing the sampled track error for the read control subsystem of FIG. 12b.

In overall operation it will be appreciated that the embodiment of the invention described above does not need word sync as a part of the recorded format, either segregated from or embedded in the data. Each set of marks, whether a three mark or two mark set, represents a multiple bit word. That word, which stores in analog form a range of values that is large enough to encode, for example, a ten-bit word, allows the entire word to be clocked as a whole by the presence of the central maxima 14a.

The accuracy of reading the information from record 10 is very high compared to popular optical recording systems. As mentioned, the location of the side maxima which encode the signal information is determined by a ratio, and that ratio is easily corrected by conventional technology for intensity and, in the case of a particular record, for temperature, wavelength, etc.

Different applications may require formatting the data on the record so that groups of words, hence groups of multi-mark sets 12, are set off by special calibration mark sets. These special mark sets are not used for data but for providing spacing calibration to identify groups of words. The calibration marks are distinguished from the data sets such as by gaps along the record in which no marks are made either before or after or both before and after the calibration sets as illustrated the three mark and two mark recordings of FIGS. 3 and 4. The calibration sets may be used to compensate for physical distortion of the record, e.g., thermal expansion or changes in the wavelength of the read or write beams, variations in spacing of the particular diode arrays used in the equipment, or other secondary effects. Although these effects are quite small, in those applications in which a relatively large amount of data is being stored in a given data mark set, the spatial resolution becomes more critical and the above compensatory operations are desirable.

MULTI-COLOR EMBODIMENT

With reference to FIGS. 14 and 15, record 10 is made with multiple layers (1, 2, 3 --- n) each of different wavelength properties with independent data on each layer. The reading is done with corresponding wavelength (color) lasers or other light sources of predetermined wavelengths. In the embodiment of FIG. 14, the colors are subtractive, meaning that they transmit all colors except the color of interest for that layer, i.e., they "subtract" the color of interest from an otherwise white spectrum. They might also be called band reject colors (or band reflect).

The active layers (1, 2, 3) of record 10 will be relatively thick, e.g., several wavelengths. This will be so because there are few dyes that have an absorption coefficient that is high enough to allow sub-wavelength thicknesses. Dielectric interference filters, almost by definition, will be several wavelengths thick depending on how sharp and narrow the band reject requirements are. The depth of focus of the interrogating beam for reading, or the writing beam if recording, will be of the order one or two wavelengths. Therefore, the layer that is in focus can be accessed; the others will be somewhat out of focus.

One way to minimize this effect is by a conventional electro-mechanical focus servo, but then only the response time of the read operations would be constrained by the relatively slow electro-mechanical system. For high speed systems, it is preferable to use an optical system having a very high longitudinal chromatic aberration.

Figure 13:
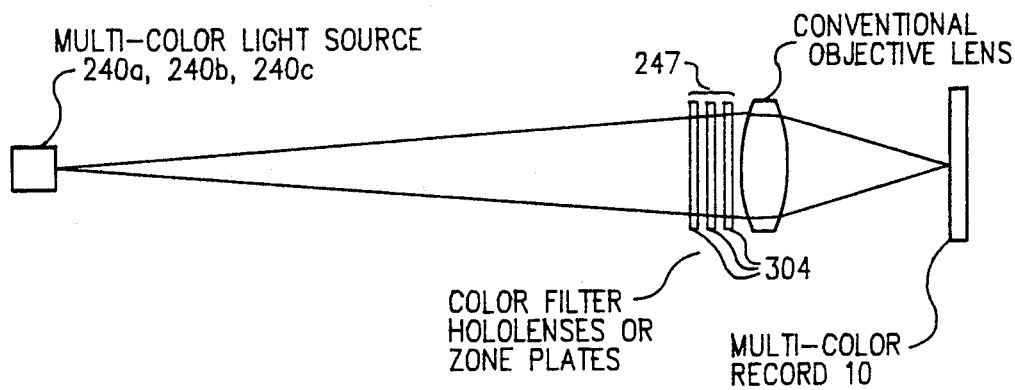
FIG. 13 is a diagram showing an alternative arrangement of optics for use in the read optics of FIG. 8b for changing the focal depth of the illuminating light beam for a multi-color record.

Such a special optical system has been incorporated into the read optics 23 and is separately illustrated in FIG. 13 and includes multi-color light source 240a, 240b, 240c, and special hololens assembly 247 for illuminating the multi-color layered record 10. Each hololens 304 of assembly 247 is made out of the same sort of band reject material as is used in the record 10, so that a particular hololens will be transparent and have no effect on the beam for the non-selected colors. Several hololenses 304 are placed in series in the beam path, where each one will modify the overall focal length of the optical system, but only when color-selected. In this way, as each light source color is selected, the hololens made with the corresponding color filter material will modify the focal point of the optical system for that color a set amount so that the data will be in focus.

Each hololens is preferably made like a zone plate, with a binary structure fabricated by depositing material through a mask as known per se. The non-color sensitive areas in the hololens should be filled with composition that will have the same net phase shift as the color filter material. Otherwise, the phase shift between the color and non-color areas, even for the non-selected color, will have a focus shift effect. This undesired shift may happen to be right for some color, but it will be wrong for all others and hence there is no useful selection by wavelength. All the hololenses may be fabricated on the same substrate.

Each color layer (1, 2 and 3) of record 10 in FIG. 14 is at least 0.1 wavelength thick, more or less, and the data marks consist of holes in each layer. The non-selected layers will still generate interference patterns due to the phase shift between the holes and the adjacent transparent material. This will cause some low level cross-talk between superposed tracks, and since the detection system in the present invention is basically analog, the non-selected layers will generate unwanted signal components in the selected layer detected signal information.

Records could be made of layers of dyes that can be bleached at discrete spots to form the data marks. The bleaching process would destroy the absorbing molecules, but presumably would not substantially alter the optical thickness of the layer. This could be used as a Write Once Read Many (WORM) record. The bleaching process can be enhanced by the addition of exothermic materials.

A record would be built up layer-by-layer. Each layer would be composed of a coating of dye. The data would be put on each layer by bleaching through a mask, by direct writing using the record optics of FIG. 8a, or by lithographic printing of the data by use of a bleaching or otherwise chemically reactive "ink". Such dye-based records can be either transmissive, or reflective if there is a reflecting layer behind the data layers. The techniques of making a reflecting record and a transmissive record are disclosed per se in my prior U.S. Pat. Nos. 3,891,794 and 4,090,031.

Alternatively, the multi-color record may be fabricated with a single layer reflective system that is composed of discrete particles of dye or of pigment, with a backing layer of absorbing material. Each particle must be less than 0.1 microns in order to keep the signal-to-noise ratio within reason. In a no-data area, the material would be reflective. As each data set is recorded, the corresponding dye would be burned out so that the recorded area would be black.

In the visible and near infrared range, only two colors are practical (red pigment and a color selected from blue or green pigment), given also that the absorption coefficient must be very large, and the dye must be stable in the environment of laser energy, coatable, not extremely poisonous, and similar practical manufacturing considerations. In this case, a red laser is used to read red particles and to form marks (destroy) green (or blue) pigment. A green laser would destroy red and read green. But even two colors permit the storage of twice as much information as in a single color record, and two times as much data per second can be accessed.

One way to make a workable more-than-two color pigment system is to coat each pigment particle with an absorbing dye where the absorption wavelength is not the same as the pigment color. For example, a red pigment may have a peak reflectance at 760 nm. It would be coated with a dye that absorbs at, say, 720 or at 820 nm. The presence or absence of the particle would be detected at 760, while energy at 720 (or 820) would be used to destroy that particle. In short, with a multi-color pigment system, each color must have two critical wavelengths, the reflecting wavelength and the absorbing wavelength. And these wavelengths must be distinct from each other and from those of other color particles. For a particular color, the two wavelengths need not be very far away. Generally, the reflection bandwidth of a pigment is rather broad, but an absorbing dye can be much narrower, so in effect the dye could be a narrow notch on the side of a much broader reflection curve. Obviously, two wavelengths for each color is a more complex system, but not impossibly so.

Multilayer dielectric coatings can have a very sharp band reject, of the order of 1% of the wavelength or less. As many as 50 or so discrete colors could be chosen. For readout there could be multiple light sources each with the corresponding bandpass filter. Alternatively, a smaller number of tunable laser diodes, or broadband sources with bandpass filters on multiple detectors may be used. A stack of 50 dielectric coatings would be quite thick so that the above hololens assembly 302 would require a corresponding number of stacked hololenses to shift focus for each color.

A read-only record 10 would be made in separate layers, one color at a time. Each stack would be deposited, photoetched through a mask to register the data, then the etched parts filled. Alternatively, each stack could be deposited through a mask, followed by non-specific coating made through a negative mask. This is a tedious and expensive process, but one that could provide a great storage capacity.

A WORM system based on dielectric coatings would be difficult because dielectric coatings do not absorb very much, and what absorption there is, is relatively broadband. Therefore, thermal writing on a color-specific basis would be difficult. But as mentioned, these layers are thick so they could be written with a non-specific-color light source where the appropriate layer is selected by focus. The dielectric stacks would need to be made with materials that will absorb some, which means that the number of colors possible is limited by overall light loss during the read operation. In order to avoid phase shift problems mentioned above, the writing beam must destroy the bandpass characteristics of the layer without forming a hole or other net phase difference.

MULTI-LAYER CHANGE OF FOCAL DEPTH EMBODIMENT

Referring to FIG. 16, an alternative embodiment of record 10 has several data layers (1, 2, 3) each separated from the nearest data layers by a transparent buffer layer or zone 350 of two or three focal depths of the interrogating or writing beam. The important point is that if the beam is large enough (remains sufficiently unfocused) on a particular layer, i.e., covers enough data sets at once, the generated interference pattern is so complex and pseudo-random as to be nearly the same as the wavefront would have been if the data layers had not been there, i.e., no distinctive interference patterns from data outside the sharpest focal region. Therefore, if there is enough inert space between the data layers, the layers that are not in focus will not appreciably influence the interference pattern that is generated by the selected (in-focus) data marks.

The data marks can be reflective and the ground transparent, or the ground can be absorptive if the system is reflective. If the ground is transparent, the system can be transmissive. These combinations are disclosed per se in my prior U.S. Pat. Nos. 3,891,794 and 4,090,031.

If the record of FIG. 16 has data marks that are transparent with a reflective ground, as might be the case with a WORM record, then the system can be either reflective or transmissive. If the data marks are transparent with absorptive ground, the system must be transmissive. In the prior art, the data spots were perhaps a quarter of the total ground because of the space between tracks as well as the 50% chance of zeros. Such a multi-layer system must have transparent ground in order to get enough light through unselected layers. In the record 10 of the present invention, there are no "zeros" in this context, and the space between tracks can be less because tracking is done differently. Therefore, the ratio of data area to ground is closer to one, so ground transparency is less important. Of course, the unavoidable light loss in each layer, selected or not, will limit the maximum number of layers to not more than about 5.

Read-out of the record of FIG. 16 can only be done one layer at a time. The interrogating beam must shift focus to select each layer. A suitable focus shifting control is shown in FIG. 17 and would be used in the control systems of FIG. 12b replacing blocks 12b-7, and 12b-8. Thus in the actuator control of FIG. 17, an actuator step pulse generator 17-3 receives a layer (track) select command and applies a shift focus signal to the focus transfer function and band pass 17-2. This shifts the focus servo moving focusing optics 244 (see FIG. 8b) to illuminate a different track layer in record 10. Alternatively, the focus shift can be done with multiple hololenses in concert with a shift in source color as shown in FIG. 13 and described above but with the focal shift being substantially greater than for the multicolored layered record of FIG. 15. The data may be recorded with the expected color in mind so that the read-out pattern is compensated for wavelength.

WORM systems for the FIG. 16 record can work the same way, i.e., reading/recording one layer at a time, selected by focus shift. One complication is that if the ground is opaque, layers must be completely recorded in sequence, starting with the layer closest to the source.

Read only records can be made by layering, or by using photochemical or thermal processes known per se.

Note that in the multi-layer changed focal depth system, the problem of crosstalk due to unselected layers is greatly reduced. This is so because of the large randomizing distance between layers due to transparent buffer layers 350.

CONCLUSION

While all the particular embodiments have been disclosed herein, it will be readily apparent to persons skilled in the art that numerous changes and modifications can be made thereto, including the use of equivalent means, devices and method steps, without departing from the spirit of the invention.

What is claimed is:

1. A system for recording information onto and reproducing such information from an optical storage medium comprising:

recording means for storing the information on an optical storage medium having a plurality of data tracks, certain of said data tracks being substantially superposed, and each said data track having a plurality of sets of spaced apart marks encoding the information as variable spacing of the marks within each of said sets; and reproducing means for reading the information stored in each of said plurality of data tracks, including light source means that is adapted to be directed at said data tracks for interacting with said plurality of sets of spaced apart marks to form interference light patterns emanating from said medium in which intervals between maxima and/or minima of such interference light patterns represent said variable spacing of marks within the sets, and said reproducing means including photosensor means and track selection means for sensing the interference light patterns caused by said sets of marks in selected ones of said substantially superposed data tracks and for converting light therefrom into electrical signals representing said information.

2. The system of claim 1, wherein said data tracks having said sets of spaced apart marks are recorded in storage medium materials having different optical properties and said track selection means of said reproducing means comprises controllable optical means for selectively responding to said interference light patterns in accordance with said different optical properties of said storage medium materials.

3. The system of claim 2, wherein said storage medium materials that have different optical properties are disposed in data layers of said optical storage medium and said plurality of data tracks are respectively superposed in different ones of said data layers.

4. The system of claim 3, wherein at least certain of said layers of said optical storage medium are contiguous.

5. The system of claim 2, wherein said storage medium materials that have different optical properties are disposed as a region of mixed particles made up of said materials of different optical properties and said data tracks are superposed in said region of mixed particles.

6. The system of claim 2, wherein said storage medium materials having different optical properties are wavelength dependent and said track selection means causes said reproducing means to selectively form said interference light patterns according to selected ones of said data tracks.

7. The system of claim 6, wherein said materials having different optical properties are wavelength selective dyes.

8. The system of claim 6, wherein said materials having different optical properties are wavelength selective photoluminescent.

9. The system of claim 2, wherein said storage medium materials have predetermined indexes of refraction, and said marks of data tracks located in said materials have substantially the same index of refraction as the materials so that said interfence light patterns are not corrupted by deviations in index of refraction due to displacement of optical material by said marks.

10. The system of claim 1, wherein said optical storage medium comprises a plurality of layers and said plurality of data tracks having said sets of spaced apart marks are respectively disposed in separate spaced data-bearing layers of said optical storage medium, and said track selection means of said photosensing means comprises controllable read optical means for selectively changing focal depth.

11. The system of claim 10, wherein said optical storage medium has at least one spacer layer without data separating adjacent said data-bearing layers.

12. The system of claim 10, wherein said read optical means for selectively changing focal depth comprises a wavelength dependent holographic lens.

13. The system of claim 3, further comprising spacer layers separating adjacent data layers, and said track selection means comprises means changing selectivity of said photosensor means to wavelengths of light in said interference light patterns and means for changing t" focal depth of said photosensor means.

14. The system of claim 1, wherein at least portions of said optical storage medium are transparent and said marks are absorptive of light from said light source means.

15. The system of claim 1, wherein at least portions of said optical storage medium are absorptive and said marks are reflective of light from said light source means.

16. The system of claim 1, wherein at least portions of said optical storage medium underlying said marks are reflective and said marks are absorptive of light from said light source means.

17. The system of claim 1, wherein said optical storage medium has a base having at least one side and said substantially superposed data tracks are located in a layer of optical material formed on said one side of said base.

18. The system of claim 10, wherein said read optical means for selectively changing focal depth comprise electro-optical means.

19. An optical data record for storing information and from which record the information is reproduced, comprising:
an optical storage medium having a plurality of data tracks, certain of said data tracks being substantially superposed, and each said data track having a plurality of sets of spaced apart marks arranged transverse to said data track encoding the information as variable spacing of the marks within each of said sets and wherein said plurality of sets of spaced apart marks when illuminated with read light form interference light patterns emanating from said optical storage medium in which intervals between maxima and/or minima of such interference light patterns represent said variable spacing of marks within the sets and hence the encoded information, said optical storage medium having track discrimination means to enable a sensing of such interference light patterns caused by said sets of marks in selected ones of said substantially superposed data tracks.

20. The record of claim 19, wherein said data tracks having said sets of spaced apart marks are respectively stored in storage medium materials having different optical properties to provide said track discriminating means.

21. The record of claim 20, wherein said storage optical storage medium materials that have different optical properties are disposed in data layers of said optical storage medium and said plurality of data tracks are respectively superposed in different ones of said data layers.

22. The record of claim 21, wherein at least certain of said layers of said optical storage medium are contiguous.

23. The record of claim 20, wherein said storage medium materials that have different optical properties are disposed as a region of mixed particles made up of said materials of different optical properties and said data tracks are superposed in said region of mixed particles.

24. The record of claim 20, wherein said storage medium materials having different optical properties are wavelength dependent so that said track discrimination means causes selective illumination and photosensing of wavelengths of said interference light patterns according to selected ones of said data tracks.

25. The record of claim 24, wherein said materials having different optical properties are wavelength selective dyes.

26. The record of claim 24, wherein said materials having different optical properties are wavelength selective photoluminescent.

27. The record of claim 20, wherein said storage medium materials have predetermined indexes of refraction, and said marks of data tracks located in said materials have substantially the same index of refraction as the materials so that said interfence light patterns are not corrupted by deviations in index of refraction due to displacement of optical material by said marks.

28. The record of claim 19 wherein said optical storage medium comprises a plurality of layers and said plurality of data tracks having said sets of spaced apart marks are respectively disposed in separate spaced data-bearing layers of said optical storage medium to provide said track discrimination means.

29. The record of claim 28, wherein said optical storage medium has at least one spacer layer without data separating adjacent said data-bearing layers.

30. The record of claim 19, wherein at least portions of said optical storage medium are transparent and said marks are light absorptive.

31. The record of claim 19, wherein at least portions of said optical storage medium are light absorptive and said marks are reflective of light.

32. The record of claim 19, wherein at least portions of said optical storage medium underlying said marks are reflective and said marks are absorptive of light.

33. The record of claim 19, wherein said optical storage medium has a base having at least one side and said substantially superposed data tracks are located in a layer of optical material formed on said one side of said base.

34. An apparatus for reproducing information from an optical storage medium that has a plurality of data tracks, certain of which are substantially superposed, and wherein each data track has a plurality of sets of spaced apart marks encoding the information as variable spacing of the marks within each of said sets, comprising:
light source means that is adapted to be directed at said data tracks for interacting with said plurality of sets of spaced apart marks to form interference light patterns emanating from said optical storage medium in which intervals between maxima and/or minima of such interference light patterns represent said variable spacing of marks within the sets; and photosensor means and track selection means for sensing interference light patterns caused by said sets of marks in selected ones of said substantially superposed data tracks and for converting light therefrom into electrical signals representing said information.

35. A system for recording information on an optical storage medium comprising:

recording means for storing information on an optical storage medium having a plurality of data tracks, different said data tracks being substantially superposed, and each of said data tracks having a plurality of sets of spaced apart marks encoding the information as variable spacing of the marks within each of said sets so that said sets of spaced apart marks when illuminated with a source of read light form interference light patterns emanating from said optical storage medium in which intervals between maxima and/or minima of such interference light patterns represent said variable spacing of marks within the sets from selected ones of said substantially superposed tracks.

36. A method of recording information onto and reproducing such information from an optical storage medium comprising:

storing information on an optical storage medium in a plurality of data tracks, and substantially superposing certain of said data tracks, said storing step causing each of said data tracks to have a plurality of sets of spaced apart marks encoding the information as variable spacing of the marks within each of said sets; and reading information stored in each of said plurality of data tracks by illuminating said data tracks with read light that interacts with said plurality of sets of spaced apart marks to form interference light patterns emanating from said optical storage medium in which intervals between maxima and/or minima of such interference light patterns represent said variable spacing of marks within the sets, and by photosensing said interference light patterns resulting from said sets of marks in selected ones of said substantially superposed data tracks and converting sensed light therefrom into electrical signals representing said information.

* * * * *